United States Patent
Fujioka et al.

(10) Patent No.: US 9,452,357 B2
(45) Date of Patent: Sep. 27, 2016

(54) GAME SYSTEM, GAME CONTROL METHOD, AND STORAGE MEDIUM FOR CUSTOMIZING WITH REGARDS TO ARRANGEMENT AND SIZE OF PANEL IMAGE

(75) Inventors: Kaname Fujioka, Minoh (JP); Yuya Tokuda, Minoh (JP); Akira Matsumoto, Toyonaka (JP); Tsuyoshi Kogata, Osaka (JP)

(73) Assignee: CAPCOM CO., LTD., Osaka-Shi, Osaka-Fu (JP)

( * ) Notice: Subject to any disclaimer, the term of this patent is extended or adjusted under 35 U.S.C. 154(b) by 166 days.

(21) Appl. No.: 14/343,042

(22) PCT Filed: Mar. 30, 2012

(86) PCT No.: PCT/JP2012/002236
§ 371 (c)(1),
(2), (4) Date: Jun. 3, 2014

(87) PCT Pub. No.: WO2013/035215
PCT Pub. Date: Mar. 14, 2013

(65) Prior Publication Data
US 2014/0329600 A1 Nov. 6, 2014

(30) Foreign Application Priority Data
Sep. 6, 2011 (JP) .................................. 2011-194212

(51) Int. Cl.
*A63F 9/24* (2006.01)
*A63F 13/2145* (2014.01)
(Continued)

(52) U.S. Cl.
CPC ........... *A63F 13/2145* (2014.09); *A63F 13/22* (2014.09); *A63F 13/26* (2014.09);
(Continued)

(58) Field of Classification Search
None
See application file for complete search history.

(56) References Cited

U.S. PATENT DOCUMENTS

| 2009/0085877 A1* | 4/2009 | Chang | G06F 3/0488 345/173 |
| 2010/0031169 A1* | 2/2010 | Jang | G06F 1/1624 715/760 |

(Continued)

FOREIGN PATENT DOCUMENTS

| JP | 7-75689 A | 3/1995 |
| JP | 10-272258 A | 10/1998 |

(Continued)

OTHER PUBLICATIONS

International Search Report for International Application No. PCT/JP2012/005653, Dec. 4, 2012.
(Continued)

*Primary Examiner* — Jason Yen

(57) ABSTRACT

A game system which a customization in regard to an arrangement and a size of a panel image can be done with an easy operation is provided. A panel image including an operation panel image corresponded to an operation associated with a game progress is displayed on the second display unit having a touch panel. When an operation on an operation panel image is detected by the touch panel, a game image in which a processing corresponding to the operation is performed is displayed and supplied to a first display unit. In a customization mode for customizing, a panel image display area and a candidate image which is a candidate of the panel image displayed in the panel image display area are displayed on the second display unit. A selection operation of the candidate image is detected by the touch panel, and the candidate image operated for selection is arranged and displayed in the panel image display area as the panel image.

18 Claims, 22 Drawing Sheets

(51) Int. Cl.
*A63F 13/26* (2014.01)
*A63F 13/22* (2014.01)
*A63F 13/42* (2014.01)
*A63F 13/92* (2014.01)

(52) U.S. Cl.
CPC ............ *A63F 13/42* (2014.09); *A63F 13/92* (2014.09); *A63F 2300/1075* (2013.01); *A63F 2300/204* (2013.01); *A63F 2300/301* (2013.01); *A63F 2300/303* (2013.01); *A63F 2300/308* (2013.01)

(56) References Cited

U.S. PATENT DOCUMENTS

2011/0099512 A1* 4/2011 Jeong .................. G06F 3/0481
715/790
2013/0005469 A1* 1/2013 Selim .................... A63F 13/06
463/37
2013/0038623 A1* 2/2013 Tezuka .................. A63F 13/06
345/589
2014/0033083 A1* 1/2014 Nack ....................... G06F 7/00
715/763

FOREIGN PATENT DOCUMENTS

| JP | 2003-210827 A | 7/2003 |
| JP | 2005-204720 A | 8/2005 |
| JP | 2005-237680 A | 9/2005 |
| JP | 2008-272123 A | 11/2008 |
| JP | 4243553 B | 3/2009 |

OTHER PUBLICATIONS

International Search Report for International Application No. PCT/JP2012/002236, Jul. 3, 2012.

* cited by examiner

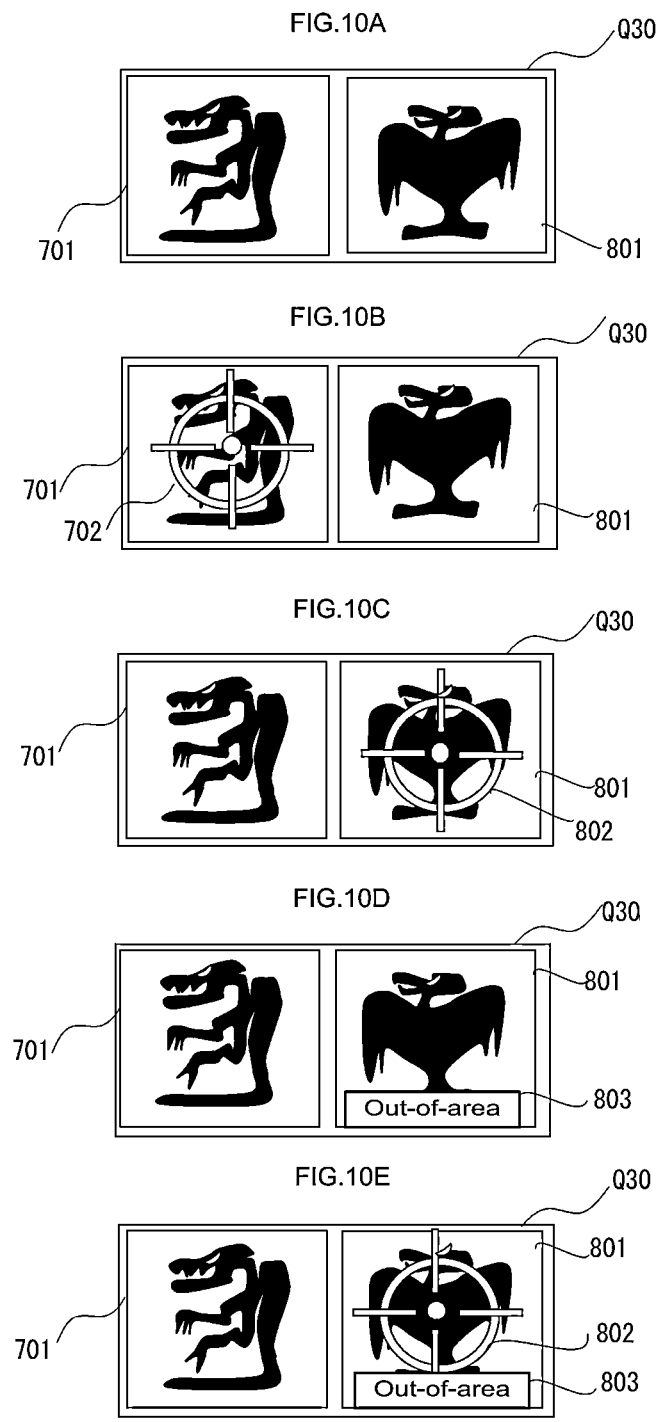

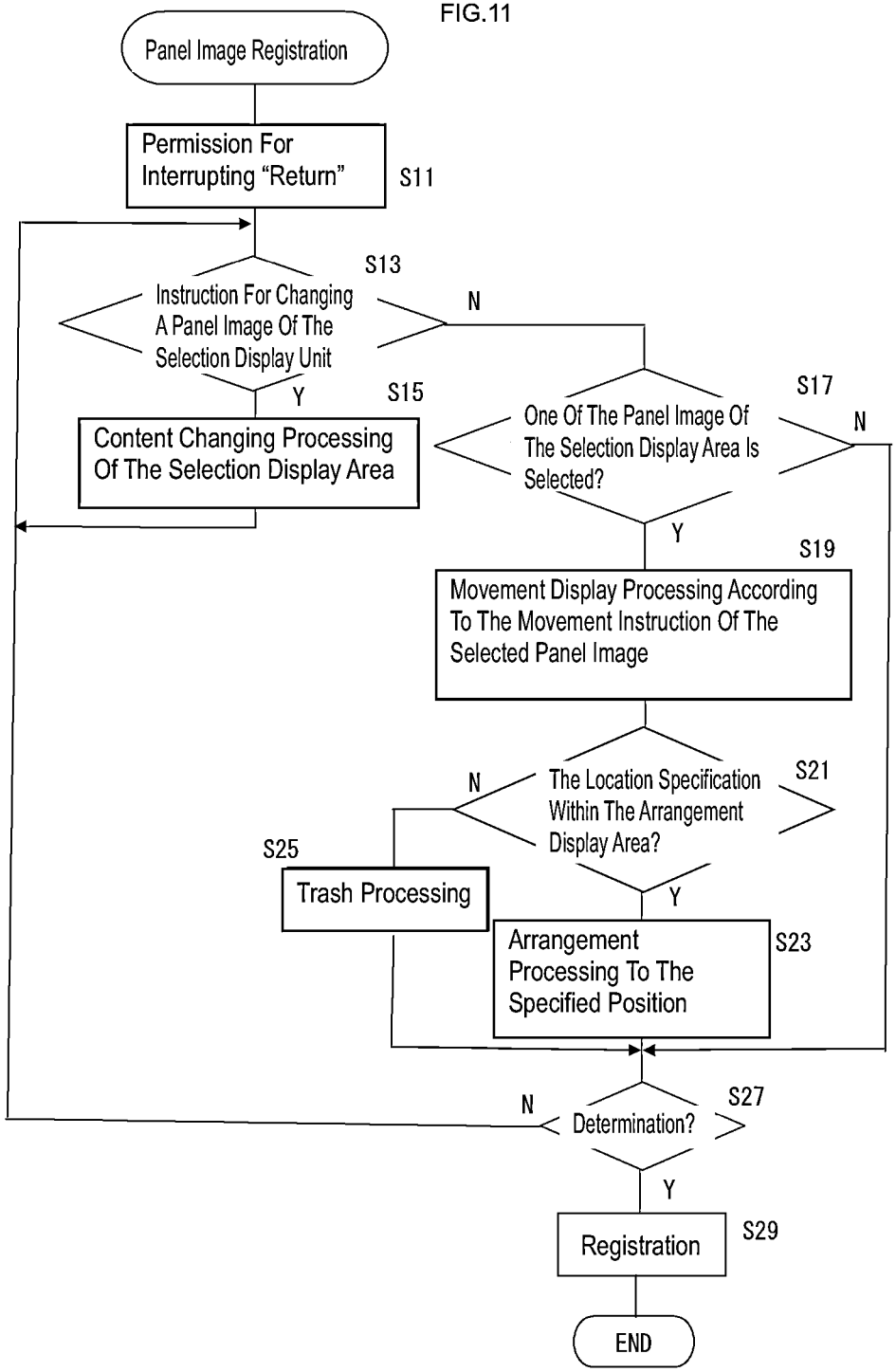

ized with characters only.

GAME SYSTEM, GAME CONTROL METHOD, AND STORAGE MEDIUM FOR CUSTOMIZING WITH REGARDS TO ARRANGEMENT AND SIZE OF PANEL IMAGE

TECHNICAL FIELD

The present invention relates to a game control technology which draws a game image on a first display unit, displays a panel image on a second display unit so that the game image can be specified, and performs a processing corresponded to a specified panel image.

BACKGROUND ART

Conventionally, a portable (compact) game device is known. A portable game device has a liquid crystal display in the central of the device body, and a group of mechanistic operation switches on left and right side thereof, and executes a game progress by operating each operation switch. Recently, a portable game device, which has a pair of liquid crystal displays on upright and downright thereof and displays various information on the lower display.

In JP4243553, a portable game device, which has a pair of liquid crystal displays in the upper and lower of the device body and a mounted touch panel for detecting a press position in a lower display, is suggested. In the game device, a game image is drawn on the upper display, and it is possible to display desired number of operation switches and the like (button image) as images on the lower screen. The button images can be set individually by player according to the guide. The button images of the frame shape of the four types are prepared in advance on the lower screen. The player can select the button image of the shape desired by the player from among them, further position the button image to a desired position of the lower screen, and change the button image to a size desired by the player. Further, the player can voluntarily select a function which the button image has, that is, a processing content corresponding to the button from function list. By customizing desired number of the button images to be operated in the middle of the game as described above, it is possible to reflect habits of the player, right-handed or left-handed or the like in regard to operating immobilized mechanistic switch, which allows the player to perform a game operation more preferably.

Further, on the internet site of the applicant <http://www.capcom.co.jp/sf4/3DS/style.html>, a portable game device that a fighting game is drawn on the upper display is described. A game in which the lower display is divided into four equal parts and complicated techniques can be registered up to four in advance to the desired area of four areas is described in this game device. According to this game, in addition to the habits of the player or the difference between left-handed and right-handed, by registering preference and difficult techniques and the like such as requiring multiple operations, it is possible to use the registered techniques easily and quickly, consequently, which makes it possible to proceed with the game advantageously.

SUMMARY OF INVENTION

Technical Problem

In order to generate the button image in the game described in 4,243,553 JP patent, it is necessary to select the shape first, then determine a position and a size, and lastly do work to associate with function. Moreover, it is necessary to read out shape and function from separate lists and select from among them, which is very troublesome. Further, since the shape of the button image does not represent the function, the button image itself does not suggest the function, and the function is shown on a figure by characters only. Therefore, in such button images, only such a level that determines whether the operation is input within the figure or not by detecting whether there is a pressing or not is obtained, there is a limit to perform a complicated direction, for example, such as making different instruction by pressing a plurality of locations within the figure.

The game device disclosed on the internet site has a limit in terms of customization, because the techniques and the like are only displayed and allocated with letters and the size of the button image to be registered are also all the same.

A portable information terminal are known, which has a customization function to adjust location of a plurality of icons displayed on the screen in consideration of frequency of use. However, such a portable information terminal only replaces the display position of icons originally displayed. Such a portable information terminal does not select a new desired icon from the candidate object nor set the desired icon to a particular region.

In order to solve the above problem, the present invention provides a game system, a game control method, and a storage medium, which makes it possible to customize the positions and sizes of panel images for instructing operation of a game progress with an easy operation.

Solution to Problem

A game system provided by the first aspect of the present invention comprises a first display unit, a second display unit, a touch panel mounted on the surface of the second display unit, a customization mode starting unit for starting a customization mode to customize display contents of the second display unit in operating or stopping a game execution mode to execute a game, a game image display unit for displaying a game image proceeding in response to operation input on the first display in the game execution mode, a panel image display unit for displaying an operate panel image corresponding to operation associated with the game progress, or one or more panel images including a display panel image corresponding to a display associated with the game progress in the executed mode, a game control unit for drawing the game image in which processing corresponding to the operation is executed and providing the game image to the game image display unit when operation to the operation panel image is detected on the touch panel in the game execution mode, a panel image registration unit for displaying the panel display area and a candidate image which is a candidate of the panel image displayed on the panel image display area on the second display unit, arranging and displaying the candidate image that selection operation is performed on the panel image display area as the panel image when selection operation of the candidate image is detected on the touch panel in the customization mode.

A game control method provided by the second aspect of the present invention executed by a computer controlling a first display unit, a second display unit, and a touch panel mounted on the surface of the second display unit comprises a customized starting step for starting a customization mode to customize display contents of the second display in operating or stopping a game execution mode to execute a game, a game image display step for displaying on the first display unit a game image which proceeds in response to operation input in the game execution mode, a panel image display step for displaying on a panel image display area of the second display an operation image corresponding to operation related to the game proceeding, or one or more panel image including a display image corresponding to a display related to the game proceeding in the game execution mode, a game control step for drawing the game image in which processing corresponding to the operation is executed and providing the game image to the game image display step in the game customization mode when operation to the operation panel image is detected on the touch panel.

A non-transitory computer-readable storage medium provided by the third aspect of the present invention storing a game program causes a computer controlling a first display unit, a second display unit, and a touch panel mounted on the surface of the second display unit to function as a customization mode starting means for starting a customization mode customizing display contents of the second display unit in operating or stopping a game execution mode to execute a game, further, in the game execution mode, a game image display means for displaying a game image proceeding in response to operation input, a panel image display means for displaying an operation panel image corresponding to operation associated with process of the game, or one or more panel images including display panel image corresponded to a display associated with the process of the game, a game control means for drawing the game image in which processing corresponding to the operation is executed and providing the game image to the game image display means when operation to the operation panel image is detected on the touch panel, further, in the customization mode, a panel image registration means for displaying the panel image display area and a candidate image which is a candidate of the panel image displayed in the panel image display area, arranging and displaying the candidate image that selection operation is performed as the panel image in the panel image display area when the selection operation of the candidate image is detected on the touch panel.

The panel image registration unit (step, means) may detect movement operation of the candidate image to the panel image display area as the selection operation and arrange the candidate image at a position where the movement operation is performed as the panel image.

The panel image display area may be divided into a plurality of sections and a plurality of the candidate images respectively have a shape which occupies one or more sections, the panel image registration unit (step, means) may apply the candidate image that movement operation is performed to the same shaped-section as the candidate image and locate the candidate as the panel image to the panel image display area.

The panel image registration unit (step, means) may change a shape of an operator image or changes a position within the operation panel image of the operator image in response to the operation input when an operation panel image including an operator image within the operation panel image is located in the panel image display area.

The panel image registration unit (step, means) may display an indicator image displayed on the first display unit as a candidate image and delete the indicator image from the first display unit when the indicator image is located in the panel image display area as the panel image.

The panel image registration unit (step, means) may display a plurality of the candidate images which corresponded to the same operation or display and have different sizes respectively.

Advantages of the Invention

According to the present invention, it is possible to customize positions and sizes of panel images corresponded to operation and display associated with a game progress with an easy operation.

BRIEF DESCRIPTION OF DRAWINGS

FIG. 10A is an image diagram showing a first target panel image and a second target panel image superimposed and displayed on the target control panel.

FIG. 10B is an image diagram showing the first target panel image superimposed and displayed on the target control panel.

FIG. 10C is an image diagram showing the second target panel image superimposed and displayed on the target control panel.

FIG. 10D is an image diagram showing the second target panel image superimposed and displayed on the target control panel.

FIG. 10E is an image diagram showing the second target scope image and out-of-area image superimposed and displayed on the second target panel display unit.

FIG. 11 is a flowchart showing an example of a processing for registering a panel image in a state in which the customization mode is turned on, which is executed by the control unit.

Figure 1:
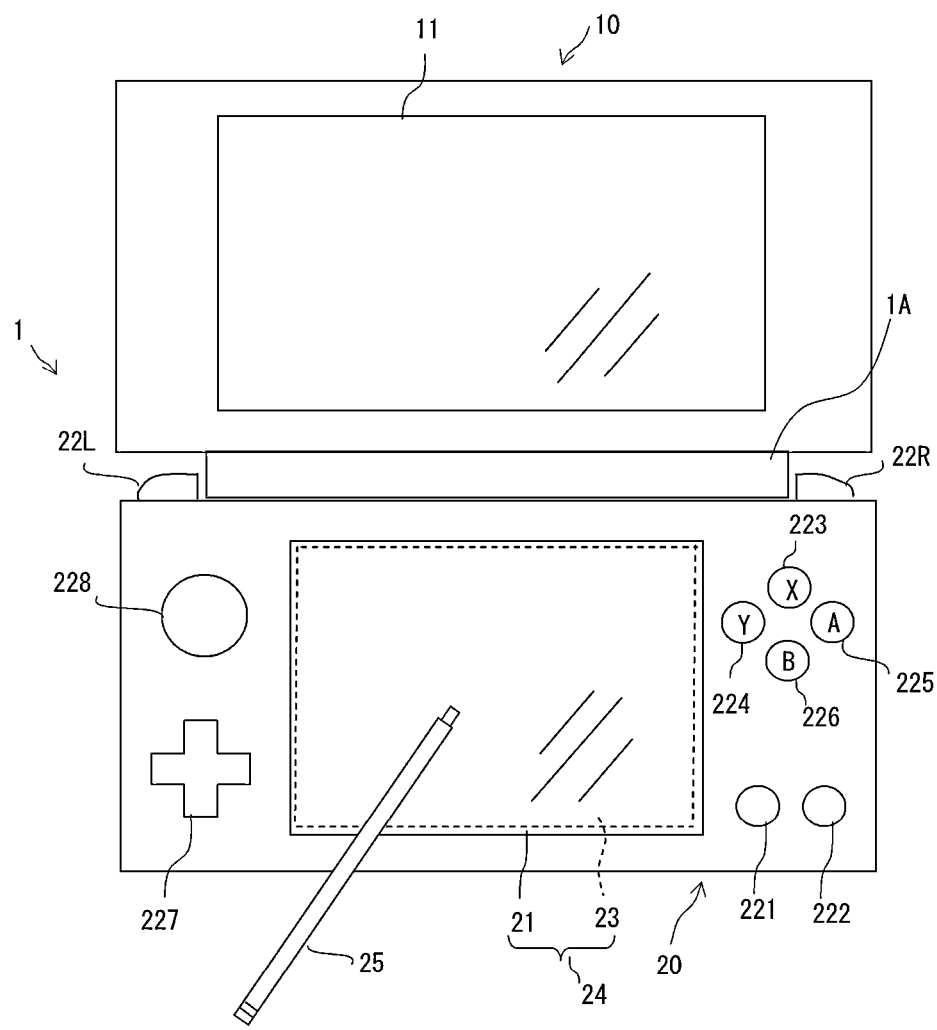
FIG. 1 is an external view showing an embodiment of a game device of the present invention.

REFERENCE SIGNS LIST 1 a game device
11, 21 a display unit
23 a touch panel
24 a touch screen
30 a control unit
306 a panel image registration unit
307 a Panel image Adjustment Unit
310 a Target Scope Unit
41 a selection display area
42 an arrangement display area
A an arrangement area
q, Q a panel image
602, 702, 802 target scope image

DESCRIPTION OF EMBODIMENTS

FIG. 1 is an external view showing an embodiment of a game device according to the present invention. As shown in FIG. 1, the present game device 1 has an upper body 10 and a lower body 20, both of which have a thin rectangular shape. The upper body 10 and the lower body 20 are connected each other so as to be opened and closed by rotating around the hinge portion 1A in the center. On the surface to which the upper body 10 and the lower body 20 are opposed, that is, on both sides of the surface shown in FIG. 1, display units 11, 21 having the desired size having rectangle shape in the center are provided respectively. Liquid crystal panel display, plasma displays, and EL (Electro luminescence) display or the like can be employed as the display units 11 and 21.

The lower 20 has a known operation member 22 as a controller of a game apparatus on the left and right sides with respect to the display unit 21. The operation member 22 has a start button 221 and a select button 222, also includes four buttons 223 through 226 comprising X, Y, A, B, a cross button 227, and an analog pad 228. Further, the operating member 22 includes an L button 22L and an R button 22R disposed at the left and right corners of the upper portion of the lower body 20.

The start button 221 is provided in order to instruct the start of the game. The select button 222 is provided for performing an instruction in order to respond the selection of a type of game and the selection request of the various others. An A button 223 is provided in order to instruct the action such as punching and jumping, for example, against the player character, for example. A B button 224 is provided in order to instruct changes of the content selected by the select button 222 or the cancellation of the action instructed by the A button 223. An X button 225 and a Y button 226 are used secondarily, in a case in which there is an instruction other than the instruction by the A button 223 and the B button 224, for example, an instruction to use weapons and items. The cross button (directional pad) 227 has vertically and horizontally pressing units and sensing units for sensing pressures in four portions. The cross button 227 is provided in order to instruct a movement direction of the player character and the like that appear in the game within the game space, and instruct movement direction of a cursor by pressing selectively to any one of the pressing units. The analog pad 228 comprises an operating handle erected so as to be tiltable and a joystick including a detector for detecting the tilting direction and tilting angle of the operating handle, and is provided in order to instruct the movement direction of the player character. The L button 22L and the R button 22R can be used for the same operation as the A button 223 and the B button 224, or also be used for an secondary operation thereof. Further, in the present embodiment, the L button 22L is operated even in a case in which the sight line of a virtual camera positioned within the game space for taking the game image is reset (camera reset).

On the upper surface of the display unit 21, a touch panel 23 is laminated. As the touch panel 23, a panel using the transparent material of the thin layers for sensing pressure operation position (including touch) can be employed. The sensing type of the pressing, in addition to the pressure-sensitive element electrode type, voltage drop detection type, optical and capacitive coupling type or the like can be employed suitably. Further, the touch panel 23 detects the two dimensional coordinate of the pressing position, for example, by detecting the pressing position of the upper surface by the player's finger or stylus pen 25 as a detection signal such as the voltage in the direction orthogonal. It is detected any of the image of the screen of the display unit 21 was pressed by corresponding to the relation between the display coordinates of the image displayed on the display unit 21 and the orthogonal detecting signal of the touch panel 23 (position coordinates) in advance. Further, a continuous pressing is detected by periodically repeating pressing detection operation to the touch panel 23 at a high speed. For example, the time when the state in which the pressing has been detected continuously is cancelled (the detection is interrupted) can be detected. Further, it is possible to detect variation (i.e., movement) of the pressing position detected in a state in which the pressing is detected continuously. In a manner of pressing with a finger or the like, the pressing position is detected with a width, in which case, after the calculation of the center point (calculation of the center of gravity), this point may be treated as the pressing position. Hereafter, a structure comprising the display unit 21 and the touch panel 23 for detecting the pressing position or the pressing state will be a touch screen 24.

Figure 2:
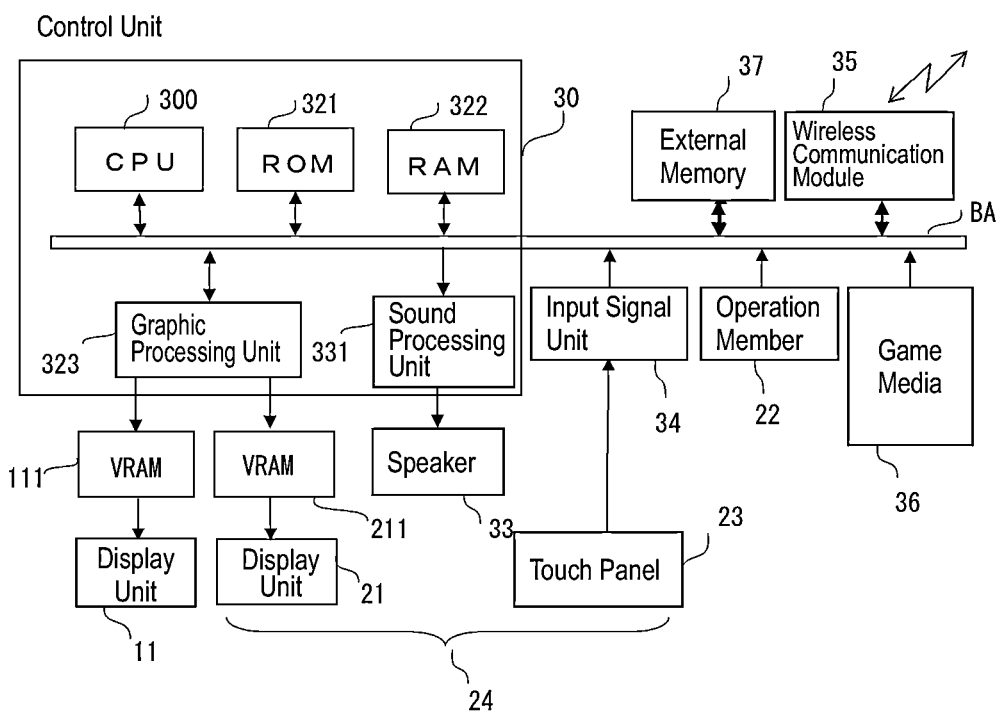
FIG. 2 is a block diagram showing an embodiment of a hardware configuration of the game device shown in FIG. 1.

FIG. 2 is a block diagram showing one embodiment of a hardware configuration of the game device shown in FIG. 1. The game device 1 has a computer and a CPU (Central Processing Unit) 300. The CPU 300 is connected to a ROM (Read Only Memory) 321 and a RAM (Random Access Memory) 322 via a bus BA.

In addition, the game device 1 has a graphic processor 323, VRAMs (Video RAM) 111, 211 and an audio processor 331. The graphic processor 323 displays required images on each of the display units 11, 21. The VRAMs 111, 211 correspond to the display units 11, 21. The audio processor 331 generates acoustic signals such as game sound effects, BGM, voices, and outputs acoustic signals to speakers (or earphone jack, not shown, provided to the side), not shown in figure, provided to the left and right of the display unit 11 of the upper body 10.

Also, the game device 1 has an Input Signal Unit 34 for receiving the detection signals from the touch screen (display unit 21 and touch panel 23) continuously and detecting the pressing and the coordinate information. Further, the game device 1, if necessary, can be connected to a wireless communication module 25. The wireless communication module 35 can implement data communication between other server devices on the internet via wireless communication based on the communication standard such as HSPA (High Speed Packet Access) or the like. In the wireless communication module 35, a game program and game data are downloaded from the server device storing a game program and game data on the internet. The game media 36 stores the game program and the game data. The game program and the game data are downloaded to the RAM 322 from the game media 36. The game data includes each character appearing in the game space, various objects making the game space, various kind of data needed for the game progress, further, images and various kinds of icons (including panel images) of the each menu screen displayed on the display unit 21. Here, the wireless communication module 35 makes it possible to perform a match game or the like with other players by going through data communication between other game device via (or without) the internet.

The ROM 21 stores a program for loading a game program and various data from the wireless communication module 35 or the game media 36 or the like to the RAM 32. Also, an external memory 37 is used for storing a game history as serve information when it is saved (stored) in the middle of the game, and is a memory stick or USB (Universal Serial Bus) memory and so on. In this case, a connection terminal, which can communicate with the external memory 37 in suitable position of the body of the game device 1, may be provided. The RAM 32 has a loading area for storing the loaded game program and game data, and a work area for using when the CPU 300 executes the game program.

The CPU 300 controls the game progress by implementing the game program loaded into the RAM 322 according to the pressing on the touch screen 24 and the contents of the operation to the operation member 22. Specifically, the CPU 300 controls the game progress in the following steps. The CPU 300 detected the operation by the stylus pen 23 by using the touch screen 24. This operation signal is input through an Input Signal Unit 34. The CPU 300 inputs the operation signal from the operation member 22. The CPU 300 executes the predetermined game progress processing corresponding to the operation signal in accordance with the game program developed in the RAM 322. The CPU 300 displays the processing result on the screen of the display unit 11 as the image (hereinafter, game image) showing the game progress. In addition, if necessary, the CPU 300 outputs an audio signal (hereinafter, game sound) showing the game progress to the speaker 33 or the earphone jack.

The graphic processor 323 executes the graphic processing of the game image to the display unit 11 in response to instructions from the CPU 300. That is, the CPU 300 determines the contents of the game images to be displayed on the screen of the display unit 111, based on the operation signal and the like input from the operation member 22 and the touch screen 24 by the player. The CPU 300 causes the graphic processor 323 to generate the necessary graphic data in regard to the contents and to perform the graphic processing by using the graphic data. The graphic processor 323 generates the game image in predetermined period, for example, each $1/60$ second based on the graphic data, and writes the game image generated to the VRAM 111. The game image written in the VRAM 11 is read out repeatedly in each $1/60$ second in frame units, and drawn on the display unit 11.

Also, the graphic processor 323 performs the graphic processing of the image to the display unit 21 mentioned below in response to instructions from the CPU 300. That is, the CPU 300 determines the contents of the image to be displayed on the screen of the display unit 21 based on the operation signal and the like input from the operation member 22 and the touch screen 24 by the player. The graphic processor 323 generates the necessary graphic data in regard to the content, and performs the graphic processing by using the graphic data. The graphic processor 323 generates the image in predetermined period, for example each $1/60$ second based on the graphic data, and writes the game image generated to the VRAM 211. The game image written in the VRAM 211 is read out repeatedly in each $1/60$ second in frame units, and drawn on the display unit 21. Here, the CPU 300, the ROM 321, the RAM 322, the graphic processor 323 and the sound processor 331 constitutes the control unit 30.

The game executable according to the present game device 1 includes a game performed by one player, in addition to a game by multiple players. The game performed by one player may be a game to be carried out against NPC (Non Player Character) controlled by the CPU so as to act according to the game rule set in advance, in which case, it may be a team competitive game such as soccer game. The type of the game can be also applied to various battle competitive games and race games.

Here, an example of the game performed by the game device 1 will be explained. The present game is a battle game, and several game spaces for the battle (battle game spaces) and a game space (base game space) which causes the player character operated by the player to prepare for a battle are prepared. In each of the battle game spaces, monster characters of NPCs which are targets are assigned and various enemy characters which are NPCs are prepared for the purpose of direction and the like which increases the difficulty of the game. Enemy characters and monster characters are controlled so as to perform various actions such as fighting with the player character or the like according to the game program in the battle game space.

The player character supplements various items (weapons, buddy characters that are NPCs which are buddies of the player character) for battles by using points given in advance or earned in the results in the past and other. The buddy characters are controlled by the game program so as to perform actions to indirectly support the battle action of the player character.

In addition, the player character is, for example at random, given a command of the extermination or capture of the monster character in the base game space. After accepting the command and supplementing and reinforcement required items, weapons, buddy characters and the like, the player character moves to a battle game space in which the monster character is assigned. Then, the player character fights which various enemy characters in the battle game space of the destination and within a predetermined time limit. The battle game space is divided into a plurality of battle areas. The player character finds finally the monster character that is a target relying on the whole map, and fights with the monster character. Then, the player character achieves the command within the time limit and returns to the base game space, thereby the player can acquire a predetermined point. After that, the CPU 300 terminates one game stage.

In the above, the player is required to instruct the use of items rapidly and determine situations quickly in order to proceed with the battle advantageously. Various instructions for the game progress can be performed by the mechanical operation member 22. However, judging from immobilization of the arrangement of the operation member 22 and abundance of kinds of the instructions, it is preferable to be possible with a certain degree to prepare the panel image corresponded to the content of instructions associated with the game progress. For example, this will be explained referring to FIG. 8. Of the panel images displayed on the display unit 21, for example when any of up, down, left and right portions of the camera panel image Q1 is pressed, the sight line of the virtual camera for taking the game image on the display unit 11 is pivoted in the corresponding direction, which makes it possible to vary the field in regard to the game space. Also, if the buddy status panel image Q10 is pressed, it is possible to comprehend the situation of buddy characters immediately and rethink of a game strategy. In addition, if the action short cut panel image is pressed, it is possible to instruct a predetermined action in regard to the player character. Accordingly, in the present embodiment, as described below, in the base game space, an arrangement in which the player character prefers to dispose the panel image corresponded to the content of the instruction of the game progress on the display unit 21 is (customized and) registered. It is possible to set the customization mode in the base game space that allows such customization processing without interrupting the progress of the battle game in the battle game space. The game progress may be interrupted in the middle of the battle game.

Figure 3:
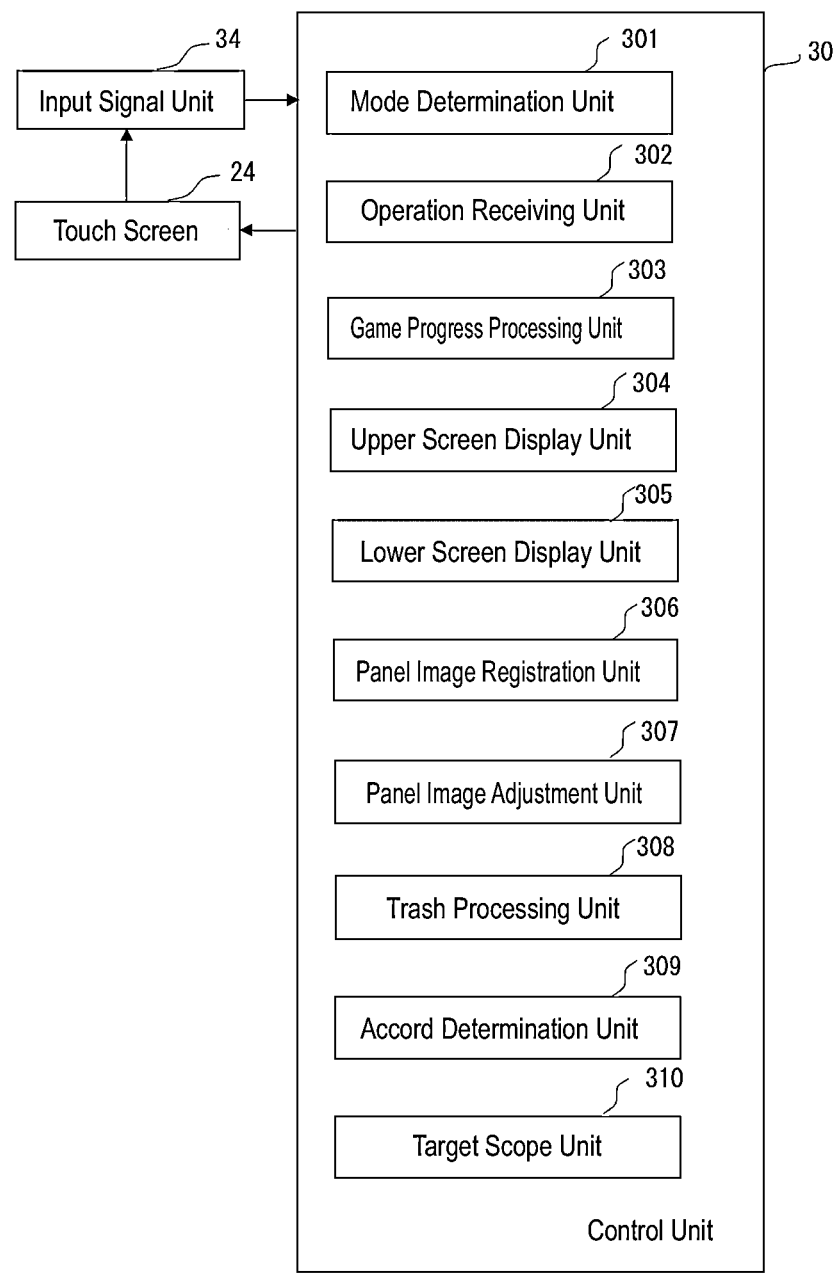
FIG. 3 is a block diagram showing an embodiment of a functional structure of a control unit.

FIG. 3 is a block diagram showing one embodiment of a functional structure of the control unit. The control 30 of the game device 1 functions as a mode determination unit 301, an operation receiving processing unit 302, a game progress processing unit 303, the Upper Screen Display Unit 304, the Lower Screen Display Unit 305, a panel image registration unit 306, a Panel image Adjustment Unit 307, a trash processing unit 308, an accord determination unit 309, a Target Scope Unit 310 and the like. The mode determination unit 301 determines whether the customization mode is selected or not after the game starts by performing the game program developed by the RAM 322. The operation receiving processing unit 302 performs a receiving processing of the operation signal from the operation member 22 and the touch screen 24. The game progress processing 303 controls the game progress based on the processing by the operation receiving processing unit 302. The upper display processing unit 304 causes the screen of the display unit 11 to draw the game image in response to the instructions from the game progress processing unit 303. The Lower Screen Display Unit 305 draws a predetermined image on the screen of display unit 21. The panel image registration unit 306 sets the selection of the panel image, arrangement on the screen and the like by using the screen of the display unit 21 based on the instructions of the player in the customization mode. In the customization mode, the Panel image Adjustment Unit 307 adjusts such as the deformation of the image to the predetermined panel image and the like showing a selected virtual camera. The trash processing unit 308 performs a cancelation (disposition) processing in regard to the panel image which is selected or supposed to be selected in the customization mode. The accord determination unit 309 determines whether or not the panel image which is the same as or corresponding to the predetermined panel image planning to be displayed on the display unit 11 in the middle of the game is selected on the display unit 21 by the panel image registration processing 306. The Target Scope Unit 301 performs the sight line changing processing of the virtual camera, in case in which the target scope for permitting the processing for causing the virtual camera to direct toward the target character is displayed and deleted, and the L button is operated.

The mode determination mode 301 determines whether or not the customization mode is selected and operated by the player after the start of the game, that is, while the player character is in the base game space or the battle game space. The selection operation of the customization mode is performed in the basic menu screen displayed on one of the display units 11 and 21. That is, if a predetermined button in the operation member 22 (e.g. start button 221) is pressed, one screen of the display units 11 and 21 returns to the basic menu screen, thereby the customization mode and the like is selectable. Also, an icon for shifting to the customization mode may be positioned and displayed so as to be possible to be operated.

The operation receiving processing unit 302 detects input of the operation signals from the operation member 22 and the touch screen 24 continuously at a predetermined period. The operation receiving processing unit 302 determines whether any of the button 221 through 226, the L button 22L, the R button 22R, the cross button 227 and the analog pad 228 is operated, and inputs a detected signal into the game progress processing unit 303 and a needed processing unit, when the operation signal from the operation member 22 is detected. In addition, when the pressing signal is input from the touch screen by pressing through a finger of the player or stylus pen 25, the operation receiving processing unit 302 calculates the position coordinates from the pressing signal, and inputs the position coordinates into the game progress processing unit 303 and the needed processing unit. The operation receiving processing unit 302 is capable of detecting an operation mode in which, for example, the stylus pen 25 is slid while being pressed on the touch screen 14 by detecting continuously whether the touch screen and the like is pressed or not. Further, it is possible to detect that the stylus pen 25 is away from the touch screen 24 if the signal which has been detected continuously is interrupted.

Based upon the signal and the like input from the operation receiving processing unit 302, the game progress processing unit 303 develops the game according to the game program, and instructs the graphic processing of the game image to the Upper Screen Display Unit 302 accordingly. For example, when it is detected that the analog pad 228 was leaned and operated in a predetermined direction, for example, to the left, the game progress processing unit 303 instructs the graphic processing for making the player character walk to the left on the game screen in response to the signal. In this case, the Upper Screen Display Unit 304 displays the direction image for causing the player character to walk to the left.

In the battle game space, the virtual camera controlled for the movement according to the instruction of the player in conjunction of the movement of the player character or, for example, by using the cross button 227 is positioned.

The image within a predetermined field of view in the sight line direction of the virtual camera is drawn on the display unit 11.

Usually, the behavior of the virtual camera is controlled by the game progress processing unit 303.

The virtual camera is, for example, capable of moving in the horizontal or vertical direction in a required radius around the player character, and controlled so that a required field of view around the player character can be taken from the rear of the player character basically.

Figure 7:
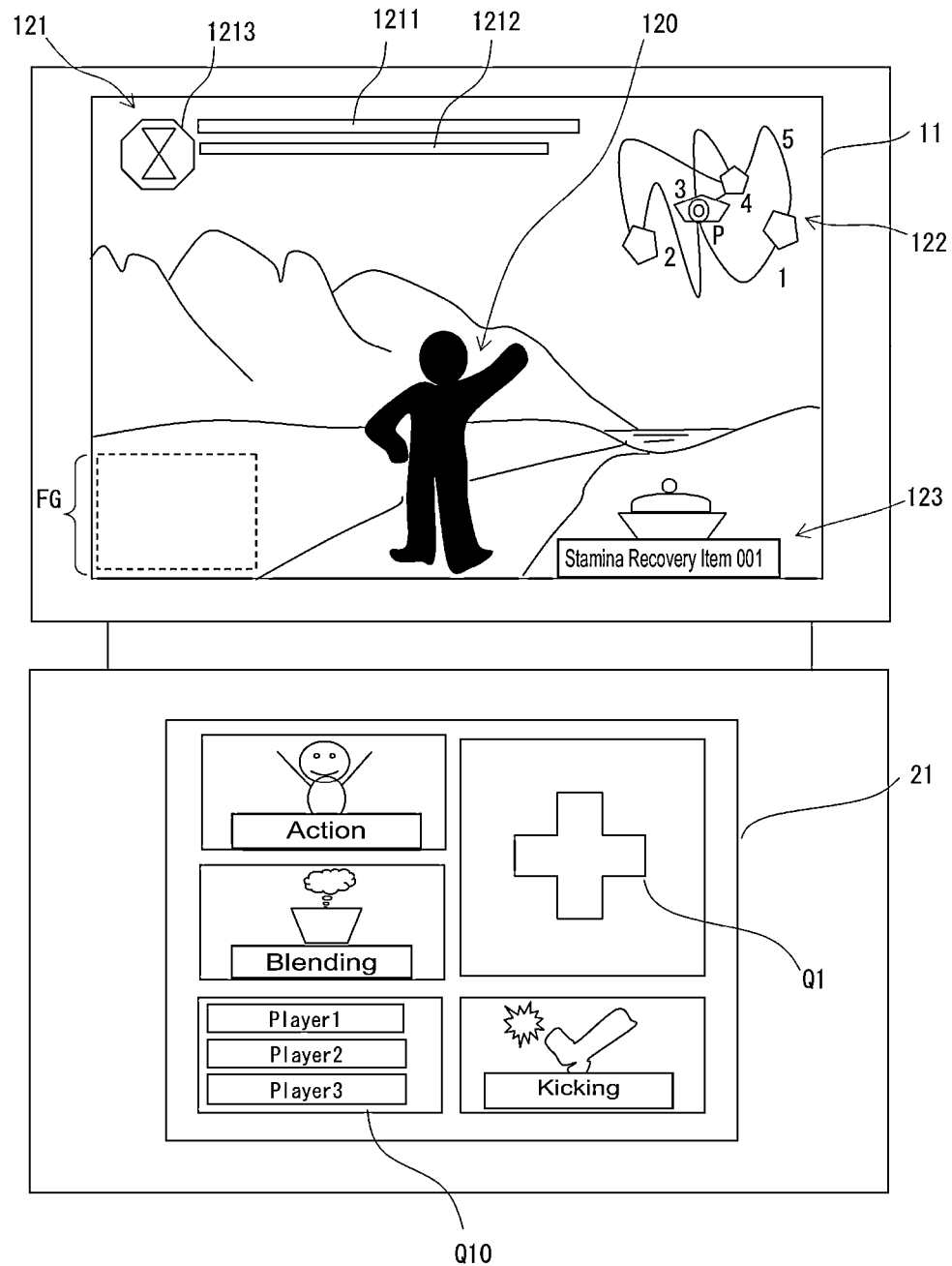
FIG. 7 is a screen showing a scene (a state where customization mode is turned off) in the game progress.
Figure 8:
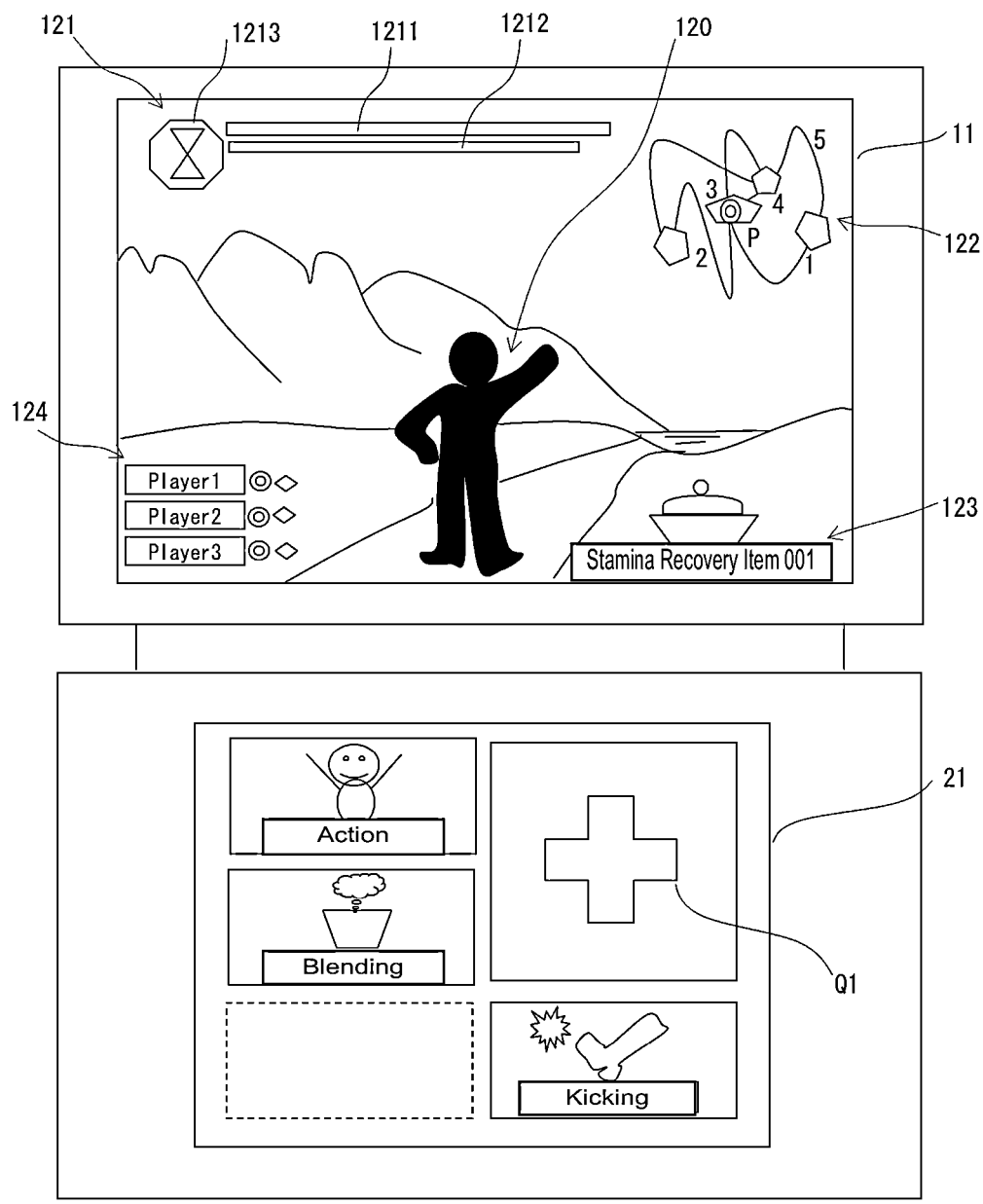
FIG. 8 is a screen diagram showing the scene (a state in which customization mode is turned off) in the middle of the game.

For example, one scene of the battle game of which the player character was taken in the center is drawn on the display unit 11 shown in FIG. 7 and FIG. 8.

Further, incase in which the position coordinate is input via the operation receiving processing unit 302 from the touch screen 24 in the middle of the game, the game progress processing unit 303 performs the processing for determining the content of instruction related to the game progress in response to the continuity of the input of the position coordinate, the changes of the position coordinate input or the like, and a displaying address showing a displaying position of various icons (including panel images) displayed on the display unit 21. For example, the game progress processing unit 303 determines that the position coordinate from the touch screen 24 is any place on the screen of the display unit 21 corresponding to and identifies the panel image shown at the position, which makes it possible to specify the panel image pressed by. As a result, the game progress processing 303 reflects a function or processing in the game progress accordingly. Additionally, after the stylus pen 25 or the like is slid on the touch screen 24, in a case in which the calculated position coordinate is changed, it is possible to detect the instruction including the slide operation by using the change of direction and change of speed.

The Upper Screen Display Unit 305 performs the display processing in regard to the panel image for setting and adjusting the panel image arrangement screen (see FIG. 4) in the customization mode, the panel image selection screen (see FIG. 5) in the customization mode, the panel image adjustment screen (see FIG. 6) in the customization mode, the arrangement panel image display (see FIG. 7 through FIG. 10) displayed on the display unit 21 in the middle of the game and the like, as mentioned below.

Figure 4:
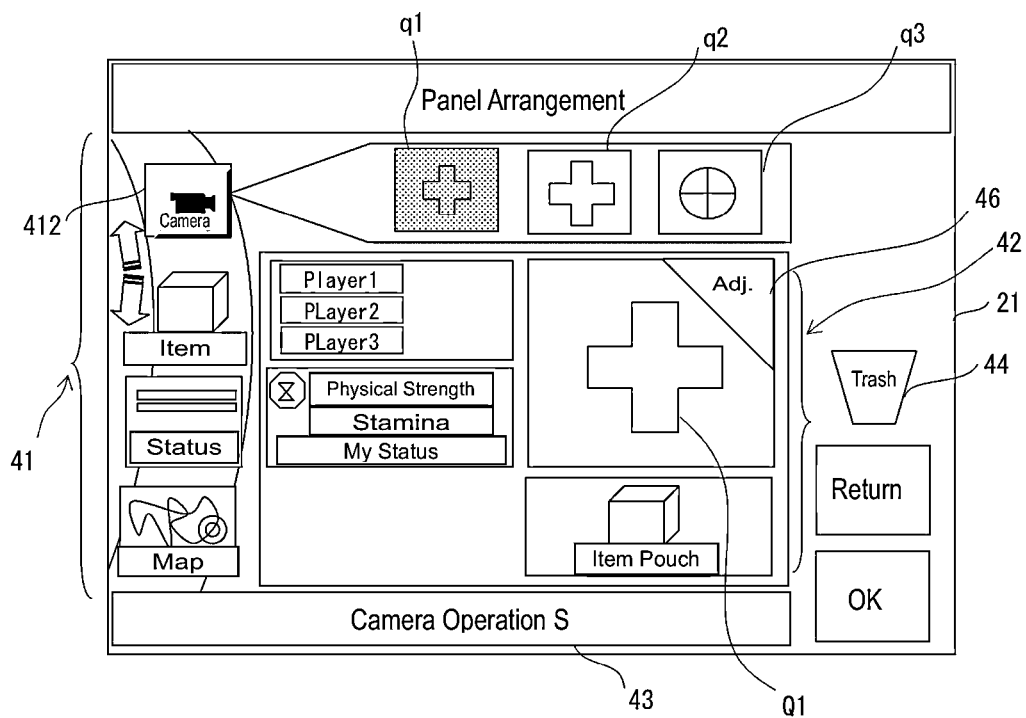
FIG. 4 is a screen diagram showing an example of a panel image arrangement screen in a customization mode.

The panel registration processing unit 306 determines an arrangement of the panel image in response to the instruction from the player so as to show the arrangement of the panel image on the panel image selection screen (see FIG. 5) in the customization mode, and performs the registration processing of the arrangement result finally. For example, the panel image arrangement screen shown in FIG. 4 is a screen in which the registration processing is performed. In the present embodiment, the customization mode is selected at anytime of after the game starts, thereby the customization mode for the arrangement processing of the panel image can be performed.

As shown in FIG. 4, the screen of the display unit 21 in the customization mode includes a display portion of the arrangement of the panel that is set as the menu in the upper side, and the selection display area 41 and the arrangement display area 42 that are the primary display areas. The panel images of the selection candidates are positioned preliminarily on the top and the left of the screen within the selection display area 41. In the arrangement display area 42, the panel image, which is selected among the panel images that occupy the substantially central portion of the screen and are displayed in the selection display unit 41 and the player desires, is selected and positioned. A guide display area 43 for explaining content of the panel image currently selected is set in the lower side of the arrangement display area 42 of the screen, and the display areas for displaying the trash can icon 44, return icon, OK icon is set on the right side of the screen.

The panel images, which are the selection candidates, are displayed collectively in each superordinate concept (category) in the one portion of the selection display area 41, for example the left area. That is, the panel image displayed in the left area of the selection display area 41 forms one virtual annular band that each of the panel images of the selection candidates is provided continuously in series. Then, if the player slides upward or downward while the touch screen is pressed by the stylus pen 25 (or finger), the annular band is turning in the slide direction, the panel image in which a new selection candidate appears on the display unit 21 and the panel which has been displayed will be deleted. The turning processing of the annular band may be performed by determining whether the position coordinates change into upward or downward and instructing the turning direction, after calculating the temporal change of the position coordinates from the touch screen 24, more preferable by setting the turning speed or the amount of turning from the change of the speed of the position coordinates. In a state in which the customization mode is ended and transferred to the game progress, the Lower Screen Display Unit displays enlarged arrangement display area 42 on the screen of the display unit 21, thereby operability in regard to arranged panel image is improved by enlarged amount.

Part of the annular band is shown on the screen in FIG. 4. In the part of the band displayed, the camera panel image 412, the item panel image, the status panel image, the map panel image is visible from the upper side. The camera panel image 412 is in the selectable position, and three kinds of the panel image q1 through q3 included in the category of the camera are arranged and displayed to be selectable. The display method of the panel image is performed hierarchically between the display of each category and the display of the panel image included in the lower-order in the selectable position, which makes it possible to display effectively a lot of the panel images even in the narrow area (selection display area 41).

The panel images of a plurality of categories are prepared as the selection candidate. For example, there are the camera panel images of the large and small size and the target control panel image, as the camera category. There are the my status panel images of the large and small size and the buddy status panel image, as the status category. There is the map panel image as the map category. There are the item selection panel image, bullet/bin switching panel image and the like, as the item category. There are the item porch panel image, the preparation panel image, and the action shortcut panel, as the shortcut category. There are a kick panel image and a sign image panel, as other categories.

Here, function (content of the processing) corresponded to the each panel will be explained briefly. The camera is associated with the function for turning the sight line of the virtual camera. When any pressure to the up, down, left and right portions of the cross button image drawn on the inside of the camera panel image is detected, the sight line of the virtual camera turns the direction corresponded to the portion of the pressure, that is, the vertical direction and the lateral direction, on the required radius around the player character. In parallel with the turning processing, the direction of the face of the player character is changed into the direction in which the virtual camera is facing. The processing is also performed in regard to operation on the cross button that is the operation member 22. The target control panel image is used for the reset operation (for example, operation onto the L button 22L) in regard to the virtual camera, and corresponded to the function to perform the instruction for facing toward the direction of the monster character which is the target in the battle game space. After the panel is operated, the current direction of the sight line of the virtual camera in the battle game space is changed so that the direction of the sight line faces the current position of the monster character or a predetermined portion of the monster character.

The my status camera is corresponded to the function that displays the status (virtual physical strength, stamina, and the like) of the player character. The physical strength decreases gradually by receiving attack action from the opposite in the battle game, and increases by using a particular item. When the physical strength is reduced up to a predetermined value, the match in the game space will be ended as defeat. Further, the stamina decreases gradually by performing various movements, and increases by taking a break action or using a particular item. Stamina value is reflected by the movement of the player character. For example, the movement or attack action corresponds to the stamina value, thereby the reduction of the capacity of action such as slowing down and decreasing of the attack force in response to the reduction of the stamina value is positioned. The buddy status panel image is corresponded to the function for displaying the status such as the situation of the physical strength of each buddy character "player 2, player 3, etc." acquired in the base game space. In a case in which there is no buddy character, for example, the whole panel image is displayed with darkening or low brightness, and the buddy status panel image becomes unselectable. The physical strength and stamina of the buddy character is also controlled so as to be increased or decreased according to the game program in the same manner, and controlled so as to perform the action with exercise capacity according to those values. Additionally, in the above, player 1 corresponds to the player character.

The map panel image is corresponded to the function for displaying planar map of the battle game space in the destination of the player character therein. The location of the player character is displayed on this map, locations of the buddy characters and monster characters are also drawn as identifiable marks, if necessary. The battle game space is divided into a plurality of the battle areas, and the game image displayed on the display unit 11 is usually the battle area that there exists the player character. As shown in FIG. 7 showing one scene of the battle game, for example, information of the battle area is described by serial number (in FIG. 7, 1, 2, 3, 4, 5) in the map image 122. Also, each time the map panel image is designated on the display unit 21, a display state of the map image 122 within the display unit 11 is switched between normal wide display and larger display alternately or in stages. The same as the map image 122 to be displayed on the display unit 11 is displayed in the map panel image. The map image 122 is switched between the wide display and the larger display in each time the map panel image is pressed. In the display unit 21, when the map panel image is arranged, the map image 122 on the display unit 11 may be hidden. In addition, the map image 122 may be displayed in regard to the only wide area display.

For example, a virtual band provided continuously annularly is formed and the annular band is turned by the slide on the touch screen 24 by the stylus pen 25, thereby the item selection panel image displays selectively apart of a plurality of the items. Then, pressing on the image being displayed makes it possible to specify the item.

The item porch panel image is corresponded to the function for displaying the item image. When the item porch panel image is pressed and specified, an image, which shows the item the player character has, is vertically and horizontally displayed, for example. The item displayed will be able to be used when the player presses on the image of the item. The items include virtual tools (smoke ball, etc.) used in the middle of the battle, and the one which is used for recovery of the virtual physical strength of the player character and increase of the virtual stamina. If the action shortcut panel image is pressed and specified, the images showing various operations (actions) arranged on a lower layer are, for example, vertical and horizontally arranged and displayed, for example. After one of the item images is pressed, the player character performs the action. The items include greeting, bow or the like.

The kick panel image makes the player character perform a kicking motion. The content of the kicking motion may be changed (for example, single kicking motion and continuous kicking motion) according to the situation of the game progress and the player character. In a case in which there exists a buddy character, the sign panel image makes it possible to exchange information virtually and acquire respective position information and status information (such as physical strength, stamina).

Figure 5A:
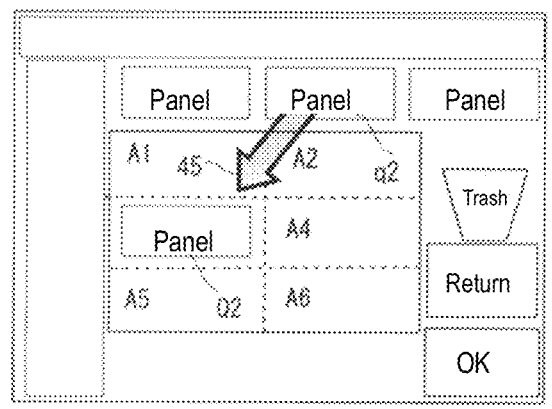
FIG. 5A is a diagram of a state in the middle of moving the panel image selected in the customization mode.

In FIG. 5, the arrangement display area 42 is set with an integer number of the panel images with the basic size, and is set to a rectangular size corresponding to 6 (3 2 matrix), in the present embodiment. As shown in FIG. 5A, the arrangement display area 42 has arrangement areas A1 through A6 corresponding to the panel image of the basic size. Accordingly, at most, it is possible to arrange six panel images with the basic size. The details of FIG. 5 will be explained below.

In FIG. 4, a plurality of the panel images is already arranged. For convenience of description, the panel image in the selection display area 41 is shown in "q" of a small letter, and the panel image in the selection display area 42 is shown in "Q" of a big letter (the same as FIG. 5).

In FIG. 4, the camera panel image q1 whose size is small is selected, and the panel image Q1 is shown in the arrangement display area 42. Moreover, there is the category of the camera in a selectable position, and it is shown that the small camera panel image q1 is non-selectable by darkening or low luminance in order to indicate that the small camera panel image q1 has been already selected. The size of the small camera panel image Q1 is a size corresponding to two arrangement areas in the row direction. Also, not shown in the figure, the display size of large camera panel image q2 within the arrangement display area 42 is a size corresponding to three arrangement areas in the row direction. In addition, regarding panel images having the same function, panel images having different sizes are prepared accordingly considering individual difference and so on in visibility and operability. For example, regarding the my status panel image having large and small (L, S) size, the small size is a standard size, and the large size is a size corresponding to two arrangement area in the column direction.

In the example of FIG. 4, in other arrangement areas of the arrangement display area 42, for example, in the upper left arrangement area A1, the buddy status panel image is selected and arranged, in the middle left arrangement area A3, the my status panel image is selected and arranged, in the right lower arrangement area A6, the item porch panel image is selected and arranged. Also, in the selection display area 41, in a case in which there exist one or two panel images included in one category, the panel images are displayed as q1, and q2. Furthermore, although the maximum number of the panel images included in one category are three as shown in an example of the camera in the present embodiment, the present invention is not limited to this, the maximum number of the panel images may be two, on the contrary, four or a predetermined number more than four. In addition, the present invention may be a manner that does not employ the hierarchical structure such as the category.

Figure 5B:
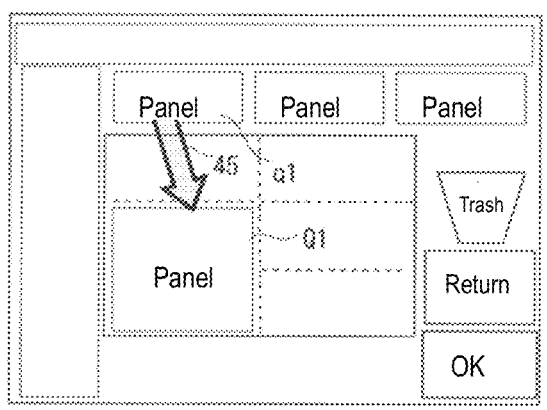
FIG. 5B is a diagram of a state in the middle of moving the panel image selected in customization mode.
Figure 5C:
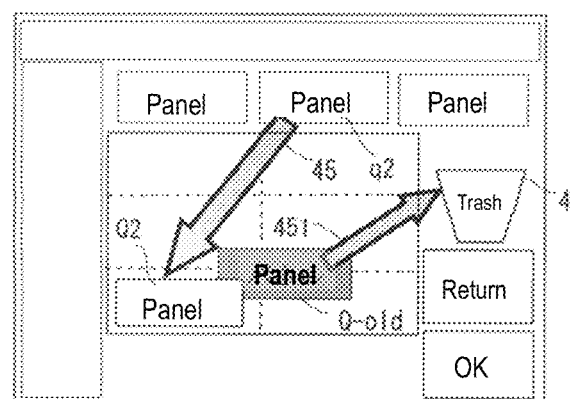
FIG. 5C is a diagram of a state of disposing of an old panel image in customization mode.

FIG. 5 is a diagram explaining the processing from the selection to the arrangement of the panel image, FIG. 5A is a diagram showing a state in the middle of moving the panel image q2 of the selection display area 41 to the arrangement area A3 of the arrangement display area 42 as the panel image Q2, FIG. 5B is a diagram showing a state in the middle of moving the panel image q1 of the selection display area 41 as the panel image Q1 having a size with two rows between the arrangement area A3 of the arrangement display area 42 and A5, FIG. 5C is a diagram showing a state in which the trash processing (disposal processing) is performed in regard to an old panel image Q-old that has been arranged in the arrangement area A5 in the middle of moving the panel image q2 of the selection display area 41 to the arrangement area A5 of the arrangement display area 42 as the panel image Q2.

First, in FIG. 5A, if it is determined that the position coordinate calculated by the pressure on the touch screen 24 by the stylus pen 25, the control unit 30 (the panel image registration unit 306) determines that the panel image q2 is selected. Then, the movement mark 45 indicating the movement direction is displayed as the effect, and the panel image q2 is moved in a manner that follows the defected position coordinate on the screen of the display unit 21, in response to a change of the position coordinate calculated by the slide on the screen 24 by the stylus pen 25. If it is determined that the detection of the position coordinate is interrupted, that is, the stylus pen 25 separated from the touch screen 24, an arrangement area (in FIG. 5 An arrangement area A3) including the position coordinate calculated lastly is extracted as the destination arrangement area, and arranged so that the panel image q2 is arranged in the arrangement area A3. Such an arrangement processing is performed, by positioning so that the center of the panel image Q2 and the center of the arrangement area A3 correspond, for example. Accordingly, if the player slides the stylus pen 25 up to entering the arrangement area A3, after that, alignment is performed automatically by the panel image registration unit 306. Therefore, it is possible to perform the specifying operation by the slide operation roughly and smoothly.

FIG. 5B shows a state just before the panel image q1 is arranged to the arrangement area A3, A5 of the arrangement display area 42. The time when the panel image q1 is changed into the panel Q1 may be any one of the selection time in the selection display area 41, in the middle of moving time in the arrangement display area 42, and the definite time of the destination arrangement area.

FIG. 5C shows a middle state in which the selected panel image q2 is arranged to the arrangement area A5 of the arrangement display area 42. Although the (old) panel image Q-old has already been arranged in the arrangement area A5, since the OK icon has not been operated yet, it is possible to change to the desired arrangement. Since only one panel image can be arranged in one arrangement area, if it is determined that overlap of area occurs due to location area information extracted from the position coordinate of the stylus pen 25 corresponding to a new panel image q2 (Q2) and arrangement area information of the old panel image Q-old, the panel image registration unit 306 displays that determination in the guide display area 43, if necessary. In addition, when the arrangement of the new panel image Q2 is determined (the stylus pen 25 is separated from the touch screen 24), after the new panel image Q2 is arranged in the arrangement area A5 and the old panel image Q-old is automatically moved (displayed address of the old panel image Q-old is changed continuously in a predetermined direction) toward the trash icon 44 according to the arrow mark 451, the panel image registration unit 306 performs the effect of the disposal processing for deleting at the display position of the trash icon 45. From the time of overlapping with the old panel image, the processing for darkening or low luminance may be performed so as to notify that the old panel image is a target of disposal.

The Panel image Adjustment Unit 301 is one processing of the customization mode, and is provided for performing adjustment such as deformation in regard to the selected panel image, for example, the camera panel image. Regardless of before or after the arrangement registration of the panel image in the customization mode, the deformation adjustment processing is acceptable only in a state in which the panel image is arranged in the arrangement display area 42 in the customization mode. In the present embodiment, the deformation or the like include the movement which is disarrangement and the scaling which is modification. The deformation or the like make it possible to improve accuracy and rapidity of the operation instruction in response to the operation habit of the player. The transformation processing is performed within the arrangement area which is arranged. In order to facilitate the deformation processing, the panel image is, for example, preferred to be composed of a plurality of the two-dimensional polygon and textures corresponding in the deformation processing.

Figure 6A:
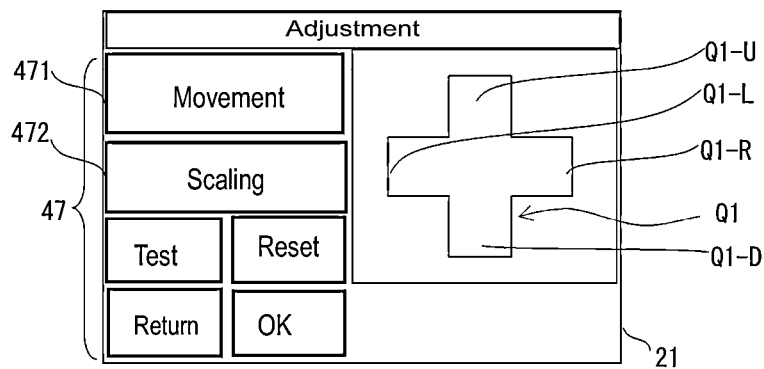
FIG. 6A is a menu screen view for selecting a menu for deformation adjustment in regard to a camera panel image.
Figure 6B:
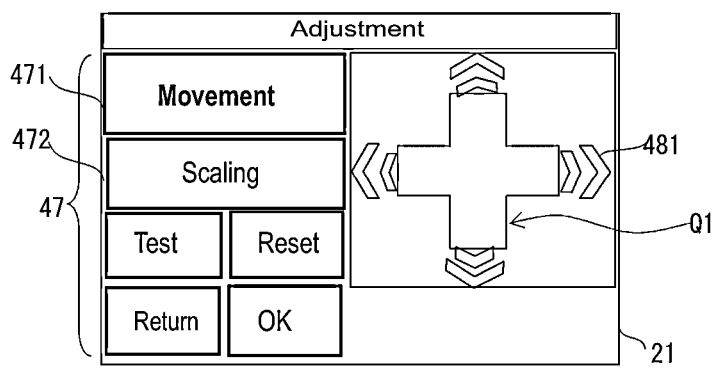
FIG. 6B is a screen diagram showing movement adjustment operation in regard to the camera panel image.
Figure 6C:
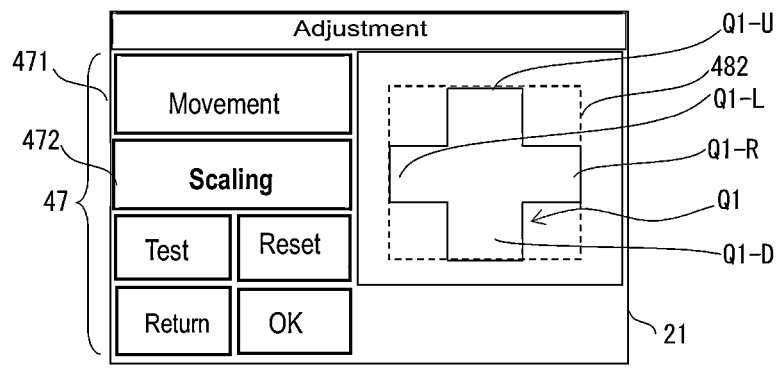
FIG. 6C is a screen diagram showing scaling adjustment operation in regard to the camera panel image.

FIG. 6 is a diagram explaining the deformation adjustment to the camera panel image, and FIG. 6A is a menu screen diagram for selecting the menu of the deformation adjustment. FIG. 6B is a screen diagram explaining the movement adjustment operation, and FIG. 6C is a screen diagram explaining the scaling adjustment operation.

As shown in FIG. 4, in a case in which the camera panel image Q1 is in the arrangement display area 42, the adjustment character mark 46 is displayed in regard to the camera panel image Q1. Then, if the image of the adjustment character mark 46 is pressed, the screen transfers to the adjustment mode screen shown in FIG. 6A.

In FIG. 6A, the camera panel image Q1 of the target of adjustment is displayed in the right half portion of a part of the display unit 21, the adjustment menu unit 47 is displayed in the other half portion. In FIG. 6A, the camera panel image Q1 is displayed in the same size as the size in the middle of the game in which actual operation is performed, it is possible to recognize directly adjustment or feeling. The display position of the panel image to be adjusted is not limited to the layout in FIG. 6A. In fact, the display position of the panel image to be adjusted is arranged in the same position as the arrangement area set in the customization mode, which makes it possible to adjust in response to the actual operation.

Here, the relationship between the operation to the camera panel image Q1 and the processing of the panel image adjustment processing 307 will be described. Of the panel images, the panel image which is adjustable regarding apart of the image, for example, the camera panel image Q1 is composed of a plurality of the polygon and the textures, and has a part of the cross button image and the other part comprising background color image. About the part of the cross button image of those, it is possible to adjust within the range of the camera panel image Q1 (movement, deformation, etc.).

The movement icon 471 and scaling icon 472 as the adjustment menu are included in the adjustment menu unit 47, further, the test icon for allowing trail operation of the operating state after adjustment, the reset icon for resetting the adjustment content, the return icon for returning to the previous screen, and the OK icon for determining the adjustment content are included. The trial operation is a verification test of the operation feeling, such as whether or not the operation habit of the player is absorbed. Here, if the movement icon 417 is specified, the operation in the movement adjustment screen shown in FIG. 6b can be done, if the scaling icon 472 is specified, the operation in the scaling adjustment screen shown in FIG. 6C can be done.

FIG. 6B is a screen diagram in the middle of selecting the movement icon 471. For example, by changing display manner in regard to the movement icon 471, it is possible to recognize that the movement icon 471 has been selected. The player presses the touch screen 24 with the stylus pen 25 and slide as it is, thereby the Panel image Adjustment Unit 307 moves and displays the cross button image Q1 on the panel image in the direction corresponding, according to sequential direction of the slide and amount of slide of the position coordinates which are calculated by the operation receiving processing unit 302. Four, that is, up, down, left and right of the arrow marks 481 are displayed as a guide, and the arrow marks 481 notify that the cross button image Q1 is movable. In addition, in a case in which the stylus pen 25 is slid diagonally, information calculated by the Panel image Adjustment Unit 307 may cause the arrow mark 481 to move (shift) in the diagonal direction corresponding.

When the stylus pen 25 (or finger) is slid, having buffer range in regard to trembling of the finger or the like may also make it possible to secure the stability of the operation. That is, when a change of the position coordinates with a predetermined size and more (for example, few numbers of dots in a pixel of the display unit 21, preferably about two dots) is calculated, the image is moved by calculated value. Additionally, the Panel image Adjustment Unit 307 makes it possible to perform the movement indication as well by using the cross button 227.

FIG. 6C is a screen diagram in the middle of selecting the scaling icon 472. For example, by changing display manner in regard to the scaling icon 472, it is possible to recognize that the scaling icon 472 has been selected. The touch screen 24 according to the substantially center of the portion of the cross button image is pressed and slid from the position to one direction of upward, downward, leftward, rightward, thereby the Panel image Adjustment Unit 307 expands or contracts (stretch) the portion of the cross button partially, according to sequential direction of the slide and amount of slide of the position coordinates which are calculated by the operation receiving processing unit 302. For example, if the stylus pen 25 is slid from the center of the cross button to upward, only the upper convex portion Q1-U and the lower convex portion Q2-U of the cross button image are stretched symmetrically only in the vertical direction. If the stylus pen 25 is slid from the center of the cross button to downward, only the upper convex portion Q1-U and the lower convex portion Q1-D of the cross button image are contracted symmetrically in the vertical direction. Additionally, if the stylus pen 25 is slid from the center of the cross button to leftward, only the left convex portion Q1-L and the right convex portion Q1-R of the cross button image are contracted symmetrically in the laterally direction. Then, if the stylus pen 25 is slid from the center of the cross button to rightward, only the left convex portion Q1-L and the right convex portion Q1-R of the cross button image are stretched symmetrically in the laterally direction. The scaling is not limited to the convex of corresponding direction, and a manner in which the entire cross button image deforms in regard to the vertical direction or the lateral direction may be acceptable. Further, the border 482 shown by the broken line in FIG. 6C shows a rectangle that circumscribes the vertical and lateral four convex of the cross button image after scaling. By displaying the shape of the rectangle, it is possible to understand the status of the scaling easily.

The Panel image Adjustment Unit 307 adjusts scaling the same as above, by operation signals of the cross button 227, the L button 22L, the R button 22R which are input via the operation receiving processing unit 302. For example, the extension of the vertical direction of the cross image is performed by the operation of the upper side portion of the cross button 227, the contraction of the vertical direction of the cross button image is performed by the operation of the lower side portion of the cross button 227, the contraction of the lateral direction of the cross button image is performed by the operation of the left side portion of the cross button 227, and the extension of vertical direction of the cross button image is performed by the operation of the right side portion of the cross button 227. In addition, the whole cross button image is contracted by the operation of the L button 22L, and the whole cross button image is expanded by the operation of the R button 22R. As other adjustment embodiment, a manner in which the width of the convex portion is changed, further, a manner in which the whole is tilted or rotated may be included.

FIG. 7 and FIG. 8 are screen diagrams showing one scene in the middle of the game (a state in which customization mode is turned off). A screen directing the game space in which the battle is performed is displayed on display unit 11 of the upper side, the customized panel images is displayed on the display unit 21 of the lower side. The operation member 22 and the like, of the lower body 20, are omitted for convenience.

In FIG. 7, the player character 120 is displayed substantially in the center of the screen on the display unit 11, further, for example, the my status image 121, the map image 122, the items being selected, here certain stamina recovery item image 123 are displayed, and the buddy status image is usually displayed in a region FG. That is, on the display unit 11, the my status image 121 or the like are synthesized and displayed on the two-dimensional image of the game space taken by the virtual camera. At least a physical strength gauge image 1211 and a stamina gauge image 1212 are displayed in the my status image 121, the physical strength and the stamina of the player character are always recognizable. In addition, a timer image 1213 for measuring the time limit of the game is also displayed. As mentioned above, the physical strength gauge image 1211 and the stamina gauge image 1212 are displayed so that the values are increased and decreased according to the consumption or recovery state of the physical strength and stamina and the gauge length is extended or contracted in conjunction with the current values. The my status image 121 such as the strength gauge image 1211, the stamina gauge image 1212, the time image 1213, and the map image 122, which are displayed on the display unit 11, are indicator images for displaying the status of the player character and the situation of the game for the player.

In the map image 122, position of the player character is shown by the mark P, in addition to this, battle area information are consecutively numbered in each of the battle areas which divides the battle spaces. In addition to the mark P, the positions of the buddy character and the target character are shown with distinguishable mark respectively in the map image 122 as necessary, thereby the player can even recognize which of the battle areas is the place in which the buddy character and the target character are, other than the player character.

In the display unit 21 in a state shown in FIG. 7, the camera panel image Q1, the buddy status panel image Q10 are arranged, in addition to this, the action panel image, the mixture panel image, and the kicking panel image are arranged.

The accord determination 309 decides whether or not any one of the items displayed on the display unit 11 accords with the panel image which is selected in the customization mode and displayed on the display unit 21, and the display of the item image which accords is cancelled displaying by the Upper Screen Display Unit 303. In FIG. 7, as the buddy status panel image Q10 is displayed on the display unit 21, the buddy status image, which is supposed to be displayed in the display region FG of the display unit 11, overlaps with the buddy status panel image Q10. Therefore, in order to omit the waste of the dual display and see the game image easily and use the game image effectively, the buddy status image which accords is deleted from the display unit 11. Also, in a case in which the panel image corresponding is arranged in the arrangement display area 42, the my status image 121 and the stamina recovery item image 123 are also hidden. The image to be displayed/non-displayed is not limited to the image to be synthesized, may be objects or the like which exist in the virtual game space. Further, when the player presses and specifies any one of the display position of the player 1, the player 2, and the player 3 within the buddy status panel image Q10, the status information (physical strength, stamina, etc.) of the specified buddy character is displayed. Or, when the player presses the buddy status panel image Q10, the status information of the each buddy character may be extended and displayed within the window formed separately on the display unit 21.

On the other hand, in FIG. 8, the buddy status panel image Q10 is not selected for customization, nor the buddy status image is displayed on the display unit 21. Therefore, the buddy status image 124 which is the same display content as the buddy status panel image Q10 is displayed in the region FG of the display unit 11, by the Upper Screen Display Unit 303. In this case, the required status information (in the figure, for convenience, indicated in ⊚ and ◇) as described is also displayed so as to be visually recognized.

FIG. 9 is a diagram explaining the target control panel image Q20 which is selected in the customization and displayed on the display unit 21. FIG. 9A is an image diagram in which the target panel image 601 is displayed corresponding to the target such as the monster assigned in each of the battle game spaces. FIG. 9B is an image diagram showing a state in which the target scope image 602 is superimposed and displayed on the target panel image unit 601. FIG. 9C is an image diagram showing a state in which the out-of-area image 603 is superimposed and also displayed on the target panel image unit 601. FIG. 9*d* is an image diagram showing a state in which the target scope image 602 and the out-of-area image 603 is superimposed and also displayed on the target panel image unit 601.

Figure 9A:
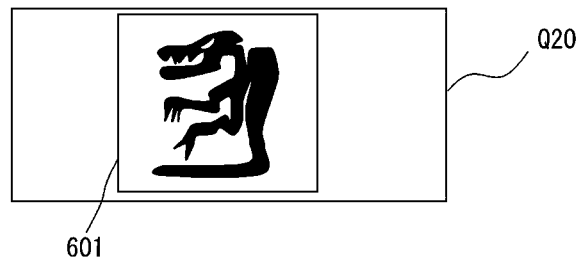
FIG. 9A is a diagram showing a target control panel image.
Figure 9B:
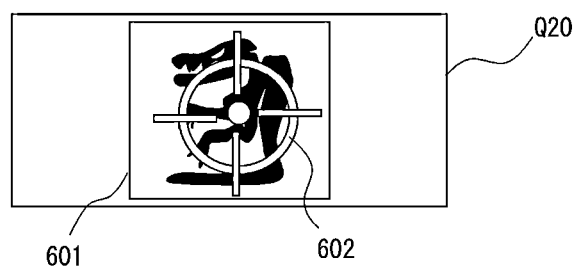
FIG. 9B is an image diagram showing a state in which a target scope image is superimposed and displayed on the target control panel.
Figure 9C:
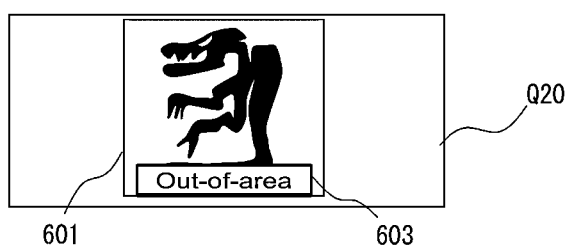
FIG. 9C is an image diagram showing a state in which an out-of-area image is superimposed and displayed on the target control panel.
Figure 9D:
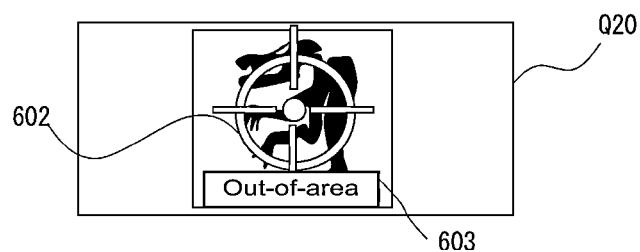
FIG. 9D is an image diagram showing a state in which the target scope image and out-of-area image is superimposed on the target control panel.

In FIG. 9A, the target control panel image Q20 is selected in the customization mode and displayed in the arrangement area specified within the arrangement display area 42. The target panel image 601 is an image that imitates the predetermined monster, for example, an image that imitates the monster character previously corresponded in order to appear in the battle game space to which the player character moves. The target control panel image Q20 is read out from the game data within the RAM 322, and displayed on the display unit 21. The monster character is a target character which is a target of the command of extermination or capture in the base game space. Further, regardless of the command, the predetermined monster, for example, a monster whose value corresponding to the strength set respectively may be set as the target character.

If it is determined that the display position of the target panel image unit 601 on the touch screen was pressed by the stylus pen 25 in the middle of the game, the Target Scope Unit 310 determines whether the target scope image 602 is displayed or not. If the target scope image 602 is hidden, the Target Scope Unit 310 superimposes and displays the target scope image 602 (see FIG. 9B), on the contrary, if the target scope image 602 is being displayed, the Target Scope Unit 310 outputs instructions for deleting (see FIG. 9A) the target scope image 602 to the Lower Screen Display Unit 305. When it is determined that the command in regard to the player character has been completed, the game progress processing unit 303 stops the display of the target scope image 602.

Additionally, the battle game space is divided into a plurality of the battle areas as described above, and a battle proceeds in any one of the battle areas. That is, the game progress processing in the game image displayed on the display unit 11 is performed in the battle area basis, thereby the amount of data developed in the RAM 322 temporarily and the processing burden is buffered. Accordingly, in a case in which the target character does not exist in the same battle area as the player character but exists in the different battle area, the player character directly does not get involved in the target character. However, on the other hand, it is preferable that the player character can recognize location or the like of the target character in terms of the reflecting the strategy. Then, the game progress processing 303 constantly monitors which battle areas the target character is. Then, if the target character separates from the same battle area as the player character to other battle area, the Target Scope Unit 310 switches the image of the target panel image unit 601 from the image of FIG. 9A to the image shown in FIG. 9C in which the out-of-area image 603 is also displayed. In the reverse case, the Target Scope Unit 310 switches the image of the target panel image unit 601 from the image of FIG. 9C to the image of FIG. 9A. In addition, if it is determined that the target character is in the different battle area in which the player character exists when the target panel image unit 601 is pressed in a case FIG. 9A is displayed, in place of the image of the FIG. 9B, the image shown in FIG. 9D in which the target scope image 602 and the out-of-area image 603 are displayed.

By the way, although the sight line of the virtual camera deviates from the standard position in regard to the player character by the operation by the player or the situation of the game progress in the middle of the game, in which case, it is important to recognize the situation of the player character by returning the sight line of the virtual camera (camera reset) to the direction (standard position) in which the player character is facing once. As an operating member therefore, for example, the L button 22L is provided. If the L button is operated in a state other than the target scope image 602 is set in the middle of the game, the game progress processing unit 303 performs the camera reset processing by acquiring the current position information of the player character in the battle game space and the current viewpoint information of the virtual camera itself. The camera reset processing is a processing for changing the line of the virtual camera so that the rear of the player character is set to the center of the field of view. On the other hand, if the L button 22L is operated in a state in which the target scope image 602 of FIG. 6B is set, the game progress processing unit 303 performs the lock-on processing of the virtual camera by acquiring the current viewpoint information of the virtual camera itself, the current position information of the player character, and the current position information of the target character. The lock-on processing is a processing for changing the sight line of the virtual camera onto the line connecting the player character and the target character and adjusting the sight line of the virtual camera so that the player character is taken on the side close to within the field of view and the target character is taken on the side far from the field of view. In a case of FIGS. 9C, 9D, since the target character does not exist in the same battle area, the camera reset processing is performed in regard to the virtual camera if the L button 22L is operated.

Further, if it is determined that the specified reset operation is performed by the predetermined button such as the L button 22L, regardless of arrangement into the arrangement display area 42 of the target control panel image, the processing of the camera reset is performed. For example, the specific reset operation, for example, is to perform operation of pushing the button twice continuously.

FIG. 10 is a diagram explaining the target control panel image Q30 which is selected in the customization and displayed on the display unit 21. Unlike FIG. 9, FIG. 10 shows a case in which several types of the monsters, here two types of the monsters is assigned in the battle game space. Two types of the monsters are the first and second target characters which are the targets of the command of the extermination or capture in the base game space. Further, regardless of the command, for example, the predetermined two kinds of monsters whose value corresponding to the strength set respectively are the largest and the second largest are set as the first and second target monsters in the battle game space. FIG. 10A is an image diagram in which the first target panel image unit 701 and the second target panel image unit 801 corresponding to the target character such as the monster assigned in each of the battle game space are also displayed. FIG. 10B is an image diagram of the state in which the first target scope image 702 is superimposed and displayed on the first target panel image unit 701. FIG. 10C is an image diagram of the state in which the second target scope image 802 is superimposed and displayed on the second target panel image unit 801. FIG. 10D is an image diagram of the state in which the out-of-area image 803 is superimposed and displayed on the second target panel image unit 801. FIG. 10E is an image diagram of the state in which the second target scope image 802 and the out-of-area image 803 are superimposed and displayed on the second target panel image unit 801. When one of the two target character is exterminated or captured, the target panel image of the target character is deleted, consequently there exists only the other target panel image.

The Target Scope Unit 310 determines which of the first target panel image unit 701 and the second target panel image unit 801 was pressed. If it is determined that the first target panel image unit 701 is pressed, the Target Scope Unit 310 determines whether the first target scope image 702 was displayed or not, if the target scope image 702 is not displayed, the first target scope image 702 is also superimposed and displayed in the first target panel image unit 701, and if the second target scope image 802 is superimposed and displayed on the second target panel image unit 801, the second target scope image 802 is deleted (see FIG. 10B). On the other hand, if it is determined that the first target panel image 701 is pressed and the first target scope image 702 is being displayed conversely, the Target Scope Unit 310 is deleted (see FIG. 10A).

If it is determined that the second target panel image unit 801 is pressed, the Target Scope Unit 310 determines whether the second target scope image 802 is displayed or not, if the target scope image 802 was not displayed, the second target scope image 802 is also superimposed and displayed on the second target panel image 801, and if the first target scope image 702 is superimposed and displayed in the first target panel image 701, the second target scope image 802 is deleted (see FIG. 10C). On the other hand, if it is determined that the second target panel image 801 is pressed and the second target scope image 802 is displayed conversely, the Target Scope Unit 310 deletes the second target scope image 802 (see FIG. 10A).

In this way, either the target scope images 702 or 708 can be displayed, thereby the player can identify which of the target is locked on by the virtual camera according to the operation in regard to the L button 22L.

In addition, the game progress processing unit 303 constantly monitors the battle area in which there exist the first and second target characters. Then, for example, when the second target character separates from the same battle area to other battle area, the Target Scope Unit 310 changes the image of FIG. 10A to the image of FIG. 10A in which the out-of-area image 803 is also drawn, on the contrary, the Target Scope Unit 310 displays FIG. 10A from FIG. 10D. Further, in a case in which the target character that does not exist in the same battle area as the player character is selected, for example, in a situation in which there does not exist the second target character in the same battle area and the second character is selected (in a case in which it is determined that the second target panel image unit 801 was pressed), the second target scope image 802 and the out-of-area image 803 are superimposed and displayed on the second target panel image unit 801 (see FIG. 10E). The second target character was described above, however, the same things applies to the first target character.

FIG. 11 is a flowchart showing an example of the processing for registering the panel image in a state in which the customization is turned on, which is executed by the CPU 30. First, in the registration processing of the panel image, interruption of the return icon (see FIG. 4) is allowed, then, it is determined whether the slide in the vertical of the stylus pen 25 within the selection display area 41 is performed or not, thereby it is determined whether the change instruction of the panel image of the selection display area 41 is performed or not. If it is determined that the instruction for changing the panel image is performed, the annular band within the selection display area 41 is turned, and the panel image in the selection candidate is changed (step S15).

On the other hand, if the instruction for changing the panel is not performed (step S13: No), it is determined whether one of the panel images in the selection display area 41 is selected or not (step S17). If this determination is denied, the process proceeds with step S27. On the contrary, the movement display processing of the panel image is performed according to the instruction for moving the selected panel image (step S19). Then, it is determined whether the stylus pen 25 or the like separate from the touch screen within the arrangement display area 42, thereby it is determined whether designation of the arrangement within the arrangement display area 42 is performed or not (step S21). If the designation of the arrangement within the arrangement display area 42 is performed, locating of the panel image in the designated position is performed (step S23). On the other hand, if the designation of the arrangement within the arrangement display area 42 is not performed, for example, it is determined as a selection mistake and so on are performed, after an automatic movement display directing to the trash icon 44 is performed, the trash disposal processing is performed via an effect to delete (step S25).

Subsequently, whether OK icon is pressed or not is determined in step S27, if the determination is denied, the same processing returning to step S13, that is, the selection about other panel image and arrangement designation processing is repeated. On the other hand, if it is determined that the OK icon is pressed, it is determined that all the arrangement processing of the desired panel image are completed, and a registration processing in regard to such an arrangement result is performed (step s29). A registration content of the arrangement result is applied in a state in which the customization mode moves to off.

Figure 12:
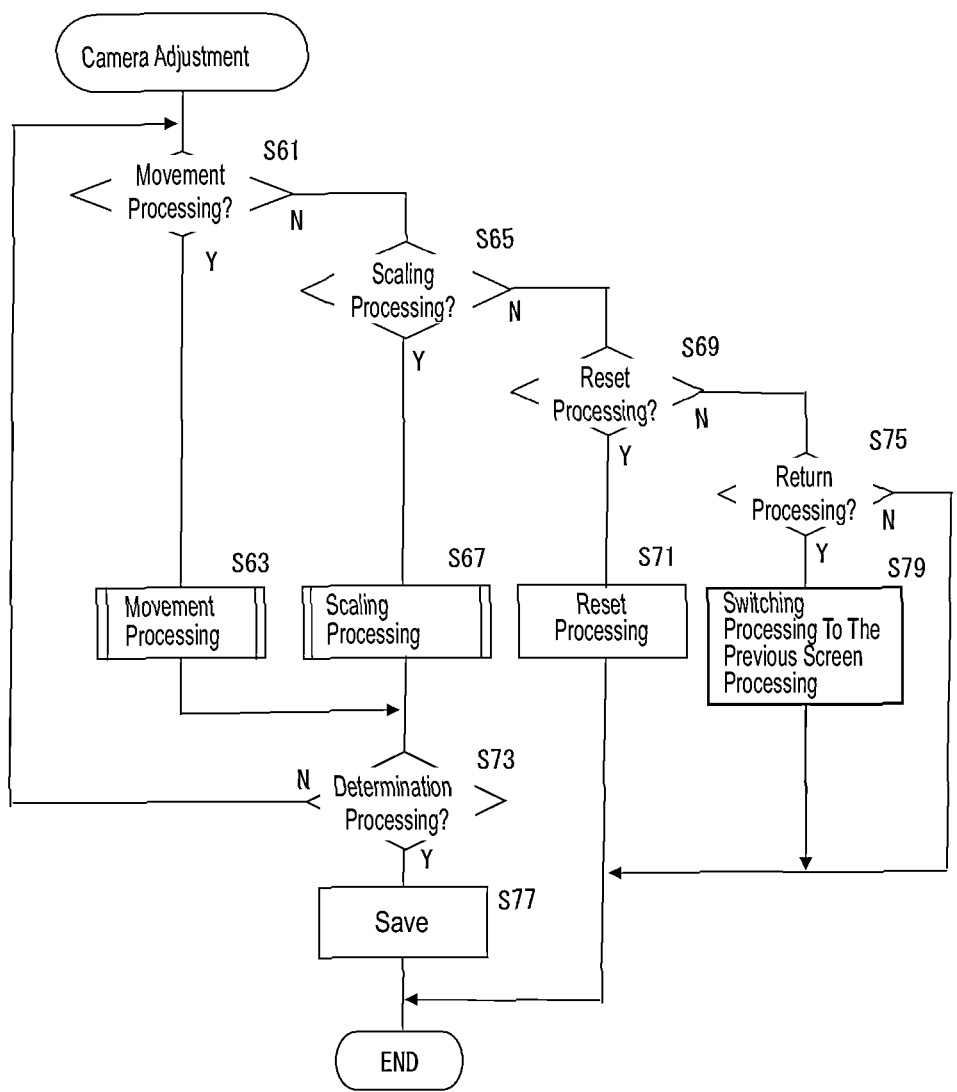
FIG. 12 is a flowchart showing an example of a processing of modification adjustment in regard to the camera panel image.

FIG. 12 is a flowchart explaining an example of the processing of the modification adjustment in regard to the camera panel image, which is executed by the control unit 30. If the adjustment icon 46 of the camera is operated, an adjustment menu selection screen shown in FIG. 6 is displayed, and it is determined whether any one of the movement icon, the scaling icon, the reset icon, and return icon is pressed in this order, for example (step S61, step S65, step S69, step S75). If the movement icon is selected, a subroutine of the movement processing is performed (step S63). If the scaling icon is selected, a subroutine of the scaling processing is performed (step S67). If the reset icon is selected, a subroutine of the reset processing is performed (step S71). The reset of the content of the processing content is a processing for returning the size, position or the like of the cross button in regard to the camera panel image, to the initial setting value.

Regarding the movement processing (step S63) and scaling processing (step S67), it is determined whether OK is pressed or not (step S73), if a OK icon is pressed, the result of the movement processing and the scaling processing are fixed, and the content of the processing is stored (step S77). Also, if the reset processing is finished (step S69), the present flow is exited. If a back icon is selected (step s75), a switch processing will be performed (step S799, and the present flow is exited.

Figure 13:
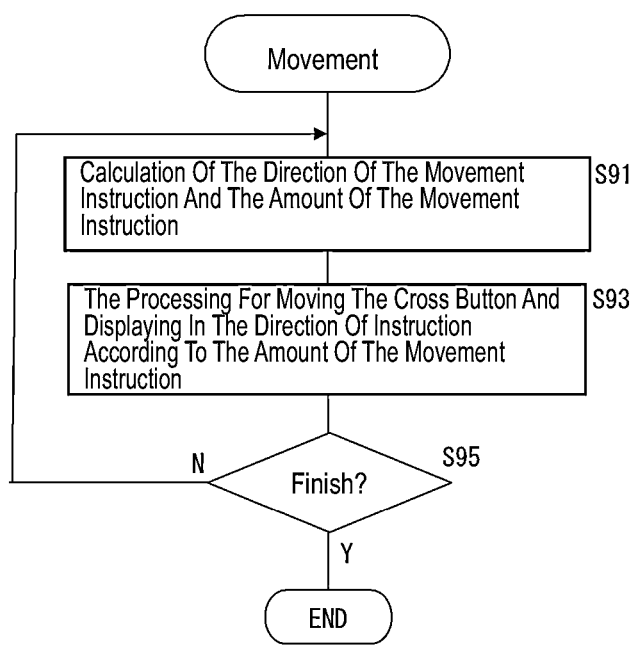
FIG. 13 is a flowchart showing an example of a subroutine of a movement processing (see step S63 of FIG. 12).

FIG. 13 is a flowchart showing an example of the subroutine of the movement processing (see step S63 in FIG. 12). First, the direction of the movement instruction and the amount of the movement instruction are calculated (step S91) from information of the position coordinate input periodically from the touch screen 24 via the operation receiving processing unit 302. Next, in the calculated movement direction, as shown in FIG. 6, the processing for moving and displaying the cross image Q1 in response to the amount of the movement instruction is performed (step S93). Then, the same processing is continued, returning to step S91 up to leading to the end instruction (step S95: Yes).

Figure 14:
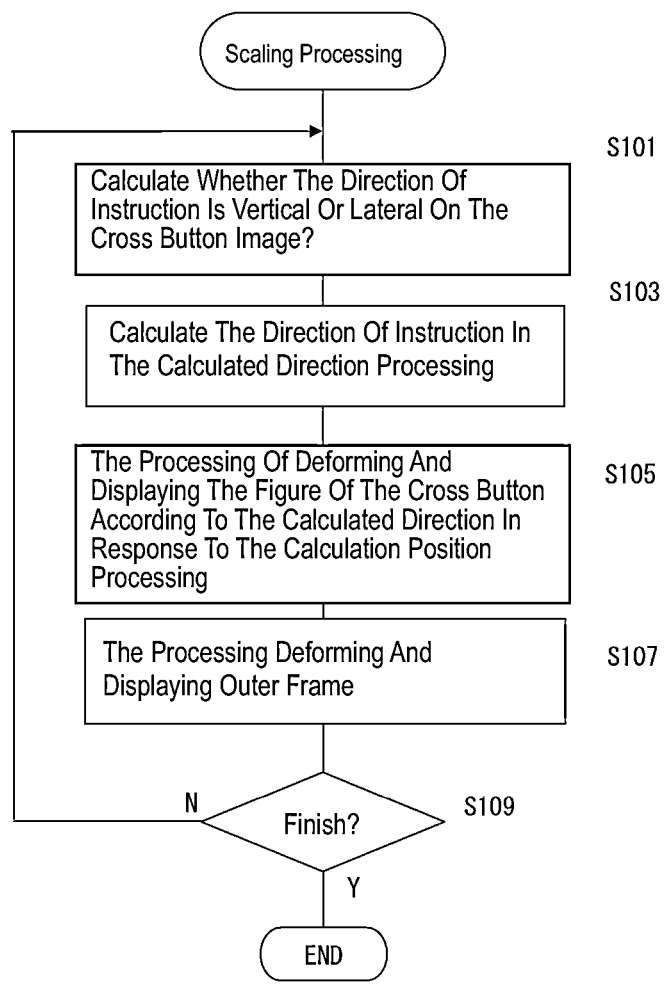
FIG. 14 is a flowchart showing an example of a subroutine of scaling (see step S67 of FIG. 12).

FIG. 14 is a flowchart showing an example of the subroutine of the scaling (see step S67 in FIG. 12). First, a calculation of whether an indicated position is a position corresponding to the vertical direction on the cross button image Q1 or a position corresponding to the lateral direction is performed (step S101) from information of position coordinate input periodically from the touch screen 24 via the operation receiving processing unit 302, further, a calculation of the indicated position in the calculated direction is performed (step S103). Then, the processing that deforms and displays a figure of the cross button image Q1 in regard to the calculated direction in response to the calculated position is performed (step s105). Next, the rectangle circumscribing each convex portion of the cross button image that is deformed and displayed, here the border 482 of the rectangle is displayed (step S107). Then, when the border 482 is displayed, it is determined whether the flow is finished or not, and the same processing is continued returning to step S101 up to leading to the end instruction.

Figure 15:
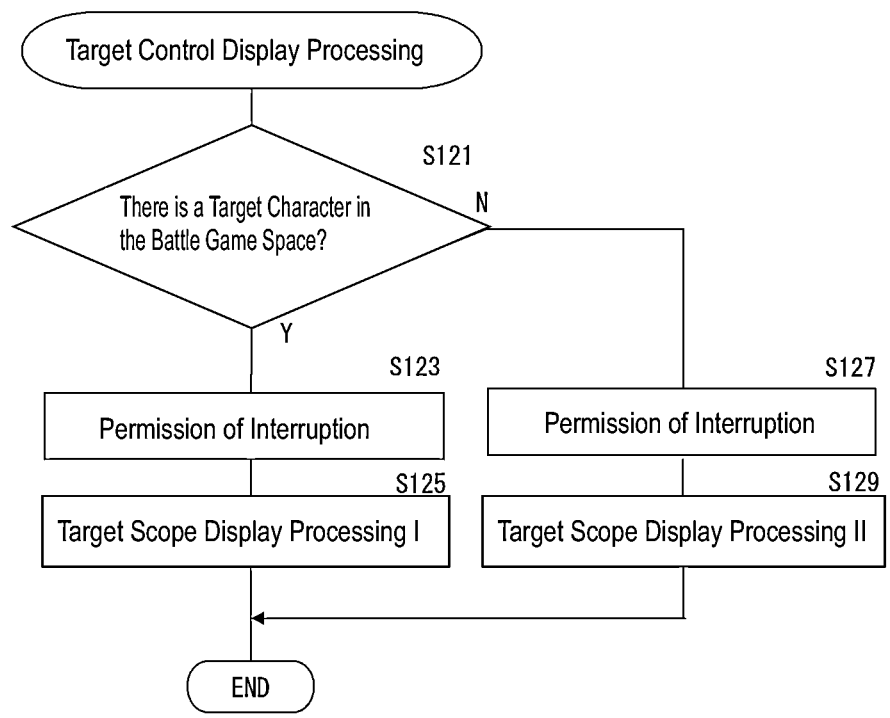
FIG. 15 is a flowchart showing an example of a target control display processing, which is executed by the control unit 30.

FIG. 15 is a flowchart showing an example of the target control display processing, which is executed by the CPU 30. This processing uses the results of the ongoing monitoring that there exist the target characters in any of battle areas. That is, in the present embodiment, the processing by using the result of the monitoring is performed in the game progress in a case in which the target panel image is arranged within the arrangement display area 42.

In this flowchart, firstly, when the player character moves to one of the battle spaces, it is determined that the number of the target characters such as monsters in the battle space are one or two (step S121). Then, in each case under the target control display processing, a predetermined processing of the interruption is permitted (step S123, step S127). And, if there exists one monster, the target scope display processing I is performed in step S125, and if there exist two monsters, the target scope display processing II is performed in step S129.

Figure 16:
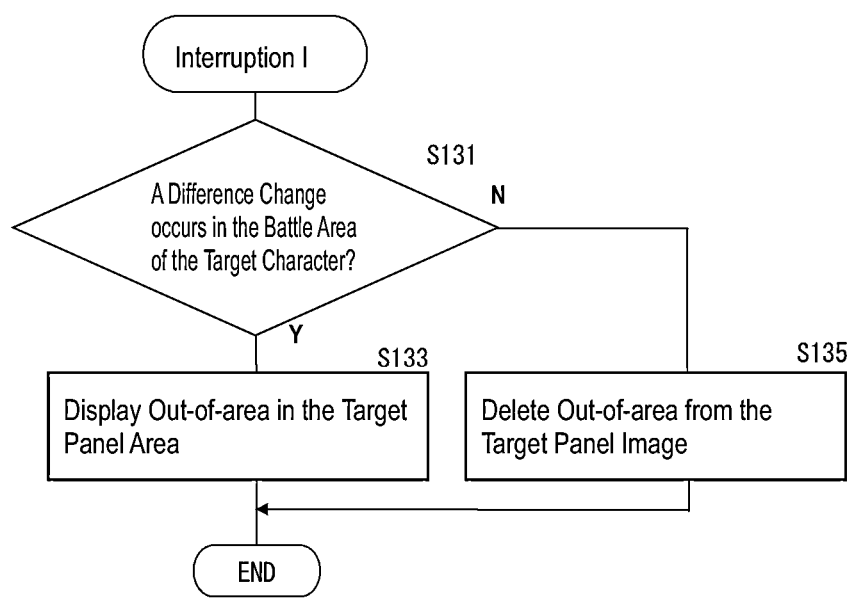
FIG. 16 is a flowchart a processing of interruption I in a case in which there is a target character, which is executed by the control unit 30.

FIG. 16 through FIG. 19 shows contents of the processing of interruption permitted interruption. FIG. 16 is a flowchart showing the processing of the interruption I in a case in which there exists one target character, which is executed by the CPU 30. First, according to the result of the ongoing monitoring in regard to the target character and the player character, it is determined whether there exists a difference change in between the battle area in which the target character exists and the battle area in which the player character exists or not (step S131). The difference change is a change of concord/discord between the battle area in which the target character exists and the battle area in which the player character exists. Note that if there is no difference change, the processing of the interruption I does not occur.

Of the difference changes, if there exist the target character and the player character in a different battle area, the out-of-area image 603 is also displayed on the target panel image 601 (step S133). On the other hand, of the difference changes, if there exist the target character and the player character in the same battle area, the out-of-area image 603 is deleted from the target panel image 601 (step S135). Then, a state of the display/non-display continues until a next difference change occurs.

Figure 17:
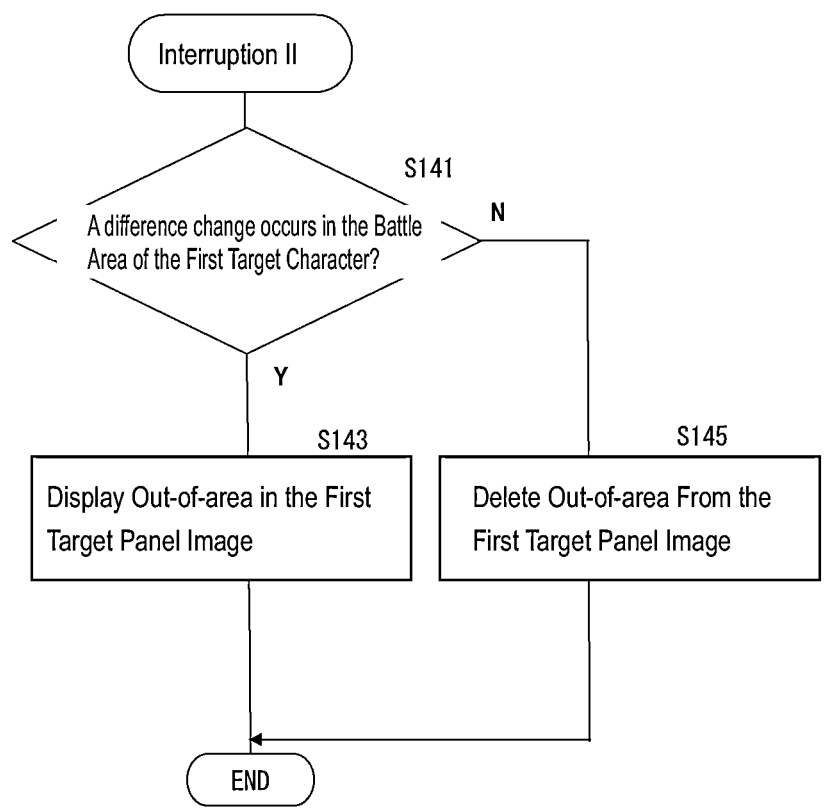
FIG. 17 is a flowchart showing a processing of interruption II in a case in which there is two target characters, which is executed by the control unit 30.

FIG. 17 is a flowchart showing the processing of the interruption II in a case in which there exist two target characters, which is executed by the control unit 30. First, according to the result of ongoing monitoring to the first target character and the player character, it is determined whether or not there exist a difference change in between the battle area in which the first target character exists and the battle area in which the player character exists (step S141). Note that if there is no difference change, the processing of the interruption II does not occur.

Of the difference changes, if there exist the first target character and the player character in a different battle area, the out-of-area image is also displayed on the first target panel image 701 (see FIG. 10). On the other hand, of the difference changes, if there exist the first target character and the player character in the same battle area, the out-of-area image is deleted from the first target panel image 701 (step S145). Then, a state of the display/non-display continues until the next difference change occurs.

Figure 18:
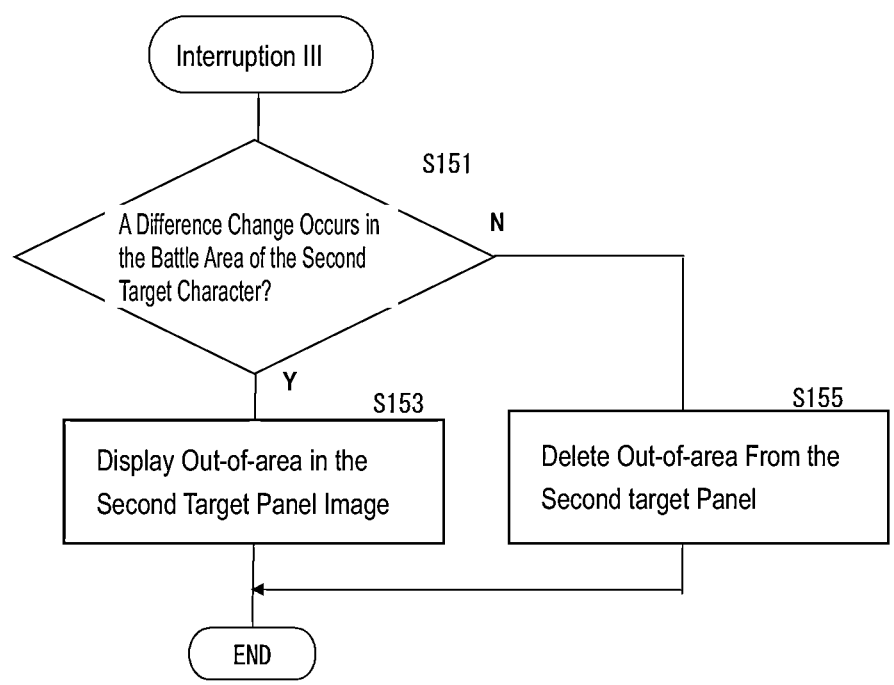
FIG. 18 is a flowchart showing a processing of interruption III in a case in which there is two target characters, which is executed by the control unit 30.

FIG. 18 is a flowchart showing the processing of the interrupt III in a case in which there exist two target characters, which is executed by the control unit 30. First, according to the result of ongoing monitoring in regard to the target character and the player character, it is determined whether or not there exist a difference change between in the battle area in which the second target character exists and in the battle area in which the player character exists (step S151). Note that if there is no difference change, the processing of the interruption III does not occur.

Of the difference changes, if there exist the second target character and the player character in the different battle area, the out-of-area image 803 is also displayed (step S153) on the second target panel image 801 (see FIG. 10). On the other hand, of the difference changes, if there exist the second target character and the player character in the same battle area, the out-of-area is deleted from the second target panel image 801 (step S155). Then, the state of the display/non-display continues until the next difference change occurs.

Figure 19:
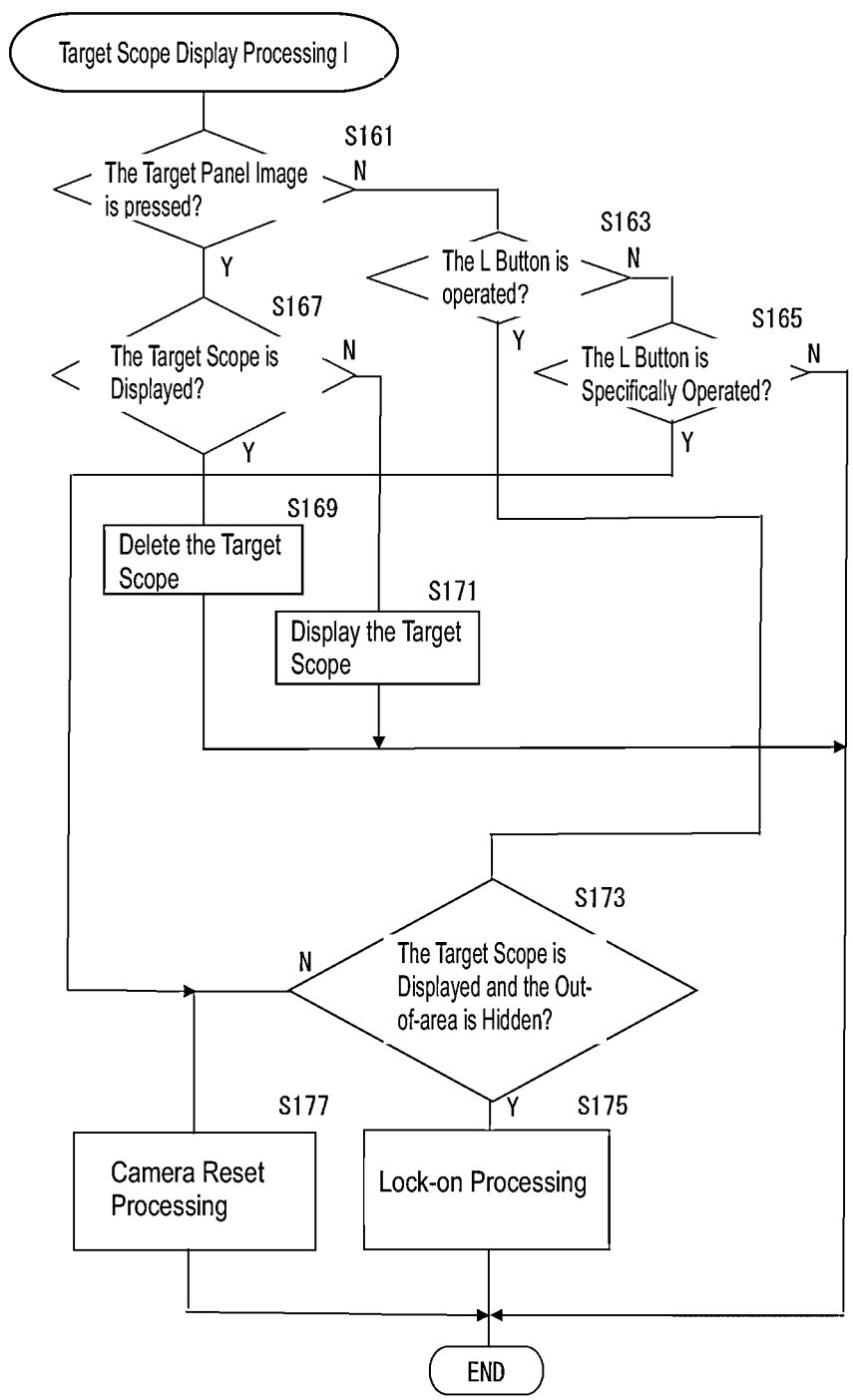
FIG. 19 is a flowchart showing an example of a target scope display processing I (see step S125 in FIG. 15).

FIG. 19 is a flowchart showing an example of the target scope display processing I (see step S125 in FIG. 15). First, it is determined whether the target panel image 601 (see FIG. 9A) is pressed or not, it is determined whether the L button 22L is operated or not, and it is determined whether the specific operation to the L button 22L (reset operation) is performed or not are in this order (step S161, step S163, step S165), for example. If it is determined that both of them are not operated, the present flow is exited.

Meanwhile, if the target panel image 601 is pressed in step S161, it is determined whether the target scope image 602 is displayed or not (step S167), and if it is determined that the target scope image 602 is being displayed, the target scope image 602 is deleted (step S169). On the other hand, if the target scope image 602 is not displayed in step S167, the target scope image 602 is displayed (step S171).

Additionally, if the L button 22L is operated in step S163, it is determined whether the target scope image 602 is displayed or not and the out-of-area display 603 is hidden or not (step S173), if the target scope image 602 is displayed and the out-of-area image 603 is hidden, the lock-on processing is performed in regard to the virtual camera (step S175), if the target scope image 602 is displayed and the out-of-area image 603 is not hidden, the camera reset processing is performed (step S177). If the specific operation to the L button 22L, for example, the operation of pressing the L button 22L twice is detected, it is determined that the camera reset is performed, the process proceeds to step S177.

Figure 20:
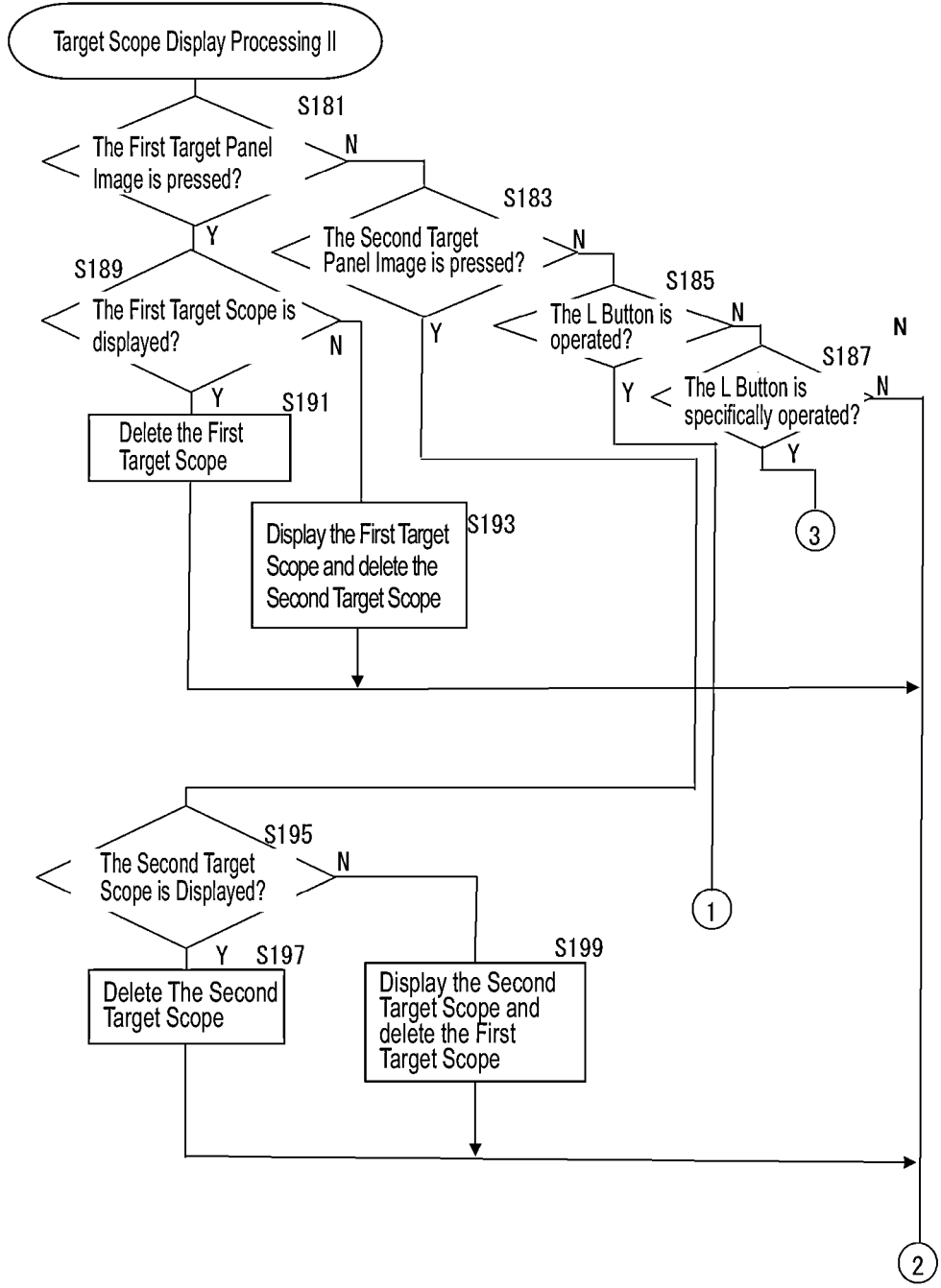
FIG. 20 is a flowchart showing an example of a target scope display processing II (see step S129 in FIG. 15).
Figure 21:
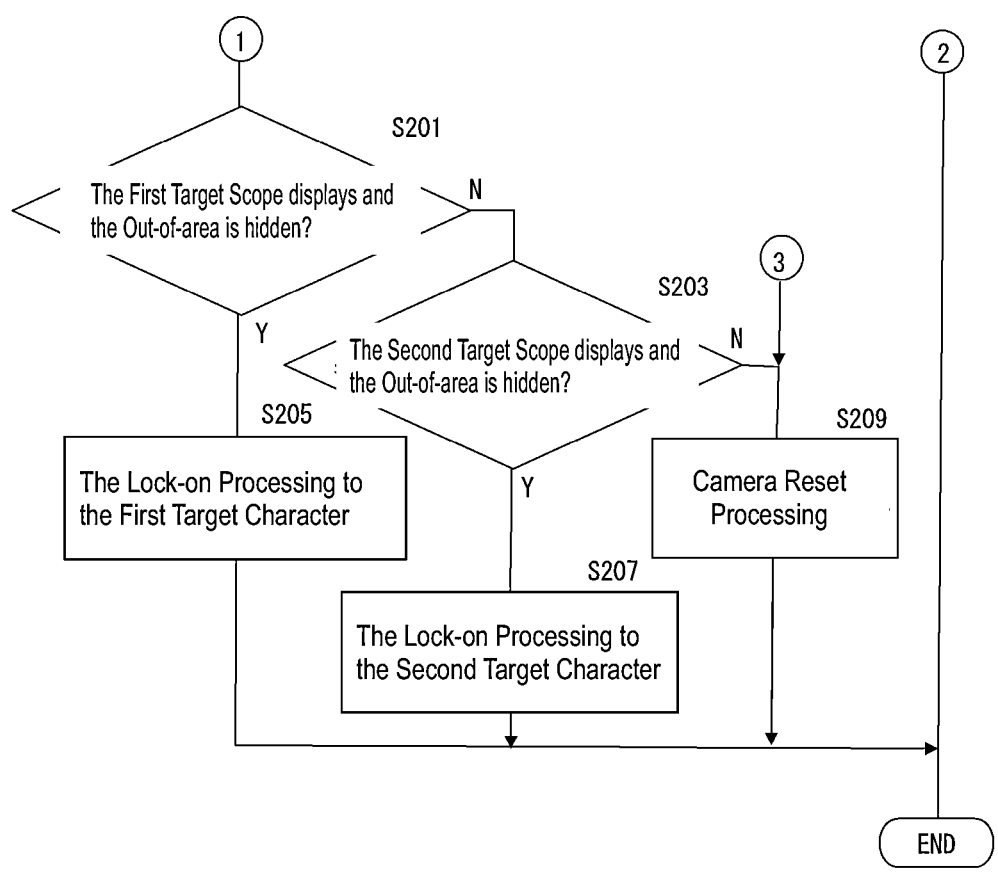
FIG. 21 is a flowchart showing an example of a target scope display processing II (see step S129 in FIG. 15).
Figure 22A:
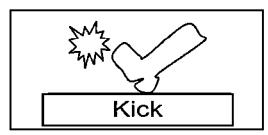
FIG. 22A is an image diagram showing an example of a kick panel image in letters "kick".
Figure 22B:
FIG. 22B is an image diagram showing an example of a kick panel image in letters "special attack".

FIG. 20 and FIG. 21 are flowcharts showing an example of a target scope displaying processing II (see step S129 of FIG. 15). First of all, it is determined whether the first target panel image 701 (see FIG. 10A) is pressed of not, it is determined whether the second target panel image 801 (see FIG. 10A) is pressed or not, it is determined whether the L button 22L is operated or not, and whether the specific operation (reset operation) of the L button 22L is performed or not, in this order (step S181, step S183, step S185, step S187), for example. If it is determined both of them are not performed, the present flow is exited.

On the other hand, if the first target panel image 701 is pressed in step S181, it is determined whether the first target scope image 702 is displayed or not (step S189). If it is determined that the first target image 702 is displayed, the first target scope image 702 is deleted (step S191). On the other hand, if it is determined that the first target scope image 702 is not displayed in step S189, the first target scope image 702 is displayed, and if it is determined that the second target scope image 802 is displayed, the second target scope image 802 is deleted (step S193).

Also, if the second target panel image 801 is pressed in step S183, it is determined whether the second target scope image 802 is displayed or not (step S195) is determined, if it is determined that the second target scope image 802 is displayed, the target scope image 802 is deleted (step S197). On the other hand, if the second target scope 802 is not displayed, the second target scope image 802 is displayed, and if the first target scope is displayed, the first target scope image 702 is deleted (step S199).

Further, if the L button 22L is operated in step S185, for example, it is determined whether the first target scope image 702 is displayed and the out-of-area image 703 is in a state of non-display or not is determined, then, it is determined whether the second target scope image 802 is displayed and the out-of-area image 803 is in a state of non-display or not in this order (step S201, step S203), for example.

If the determination in step S201 is affirmative, the lock-on processing of the virtual camera to the first target character is performed (step S205). On the other hand, if the determination in step S203 is affirmative, the lock-on processing of the virtual camera to the second target character is performed (step S207). Furthermore, on the other hand, if both step S201 and step S203 is negative, the camera reset processing to the virtual camera is performed (step S209).

If a specific operation to the L button 22L, for example, the operation of pressing the L button 22L twice is detected (step S187: Yes), it is determined that the camera reset is performed and the process proceeds to step s209.

In the present invention, the following aspects can be accepted.

(1) In the target control, in a case in which there exists the target character within a different battle area, the out-of-area images 603, 703, 803 are displayed and the lock-on to the target character cannot be accepted, however, in addition to this, for example, in a game in which the target character dives into the ground, when the L button L22 is operated in a state in which going underground is detected, a detection impossible image is also displayed, thereby it may be possible to inform that the lock-on cannot be done.

(2) In a game which the target character dives into the water, the camera reset toward the target character may employ a processing different from a case on the ground. For example, in a case in which the target character is on the ground, the lock-on of the virtual camera is performed by turning on a horizontal plane, in a case in which the target character is under the water, the lock-on of the virtual camera is performed by turning on a horizontal plane and on a vertical plane, which may make the target character confront right in front of the player character.

(3) In the present embodiment, the target scope image is employed as shown in FIG. 9 and FIG. 10, the image of the time of setting the target scope is not limited to this.

A design formed so that it is easy to identify whether the target scope is set or not may be used. Or expression by change in regard to the target panel image section, such as changing or blinking at least one of the shape and display color of the target panel image unit shown in FIG. 9 and FIG. 1, may be used.

(4) Additionally, it is not limited to the target panel image, an image displayed within the panel image may be changed according to the game situation. For example, the kick panel image (see FIG. 7 and FIG. 8) may be changed according to the game situation. Specifically, in a game in which the player character carries a sword, the kick panel image may be changed, between in sheathing sword state in which the player character sheathes the sword and in a drawing sword state in which the player character draws and raises the sword. In the sheathing sword state, the player character can take action such as running, however, the player character is controlled so as not to be able to attack by using the sword, in the drawing state, the player character is prohibited from taking part of action such as running, however, the player character is controlled so as to be able to attack by using the sword. In such a game, the image displayed on the kick panel image may be changed according to the sheathing sword state and the drawing sword state. For example, in the sheathing sword state, the icon of the kick panel shown in FIG. 19A is displayed, in the drawing sword state, the letters of the special attack or the like shown in FIG. 19B is displayed. In a case in which the panel image is touched (sheathing sword state) in a state in which the icon of the kick panel image is displayed, the player character performs the kick action. On the other hand, in a state (the drawing sword state) in which the letters or the like the special attack are displayed, the player character performs a special attack. The special attack is an attack, for example, by using the sword, and may be an attack which cannot be performed by operating other operation member 22.

(5) In addition, a panel image for changing an image displayed on the panel image according to the game situation of the target panel image or the like is not treated as the target to be customized (panel image), and may be displayed fixedly. Further, the panel image may be displayed on the display unit 11. For example, in a case in which the target panel image is displayed on the display unit 11, display or non-display of the target scope image may be switched by the button of the operation member 22 in place of the pressing.

(6) The manner in which the camera reset is performed by pressing the L button 22L twice was explained above, it is not limited to this, other buttons of the operation members 22 may be used, and a button image for camera reset may be separately provided within the display unit 21.

(7) In this embodiment, the range of the selection display area 41 is composed of the upper portion and the left side portion of the display unit 21, however, it is not limited to this, if the arrangement display area 42 can be secured, the selection display area 41 may be provided annularly around the arrangement display area 42, for example.

(8) The camera panel image has a shape imitating a cross key, however, may has a shape imitating a joystick and the like and imitating an analog stick. In addition to the cross key, a panel image imitating a physical operator such as an analog stick and a button. According to this, the player can play the game deciding the arrangement of the camera panel image freely. In a case in which a panel image imitating the physical operator is arranged, the input of the physical operator cannot be accepted. According to this, even if the operator is operated by mistake, it is possible to avoid affecting on the game progress.

(9) In this embodiment, the two screen of the display units 11, 21 are used, however, one screen divided into two regions may be used. For example, one screen of the touch screen divided into two regions may be used.

Although the game program is stored in the game media 36 in this embodiment, the medium storing the game program of the present invention is not limited to the game media 36. The medium may be a storage medium in which a server on the network stores a game program, or may be a storage medium in which an internal memory or external memory of the game device 1 in which the game program on the server was downloaded via network stores a game program.

The invention claimed is:

1. A game system comprising:
   a first display unit;
   a second display unit;
   a touch panel mounted on the surface of the second display unit;
   a customization mode starting unit for starting a customization mode to customize display contents of the second display unit in operating or stopping a game execution mode to execute the game;
   a game image display unit for displaying a game image in response to an operation input, a first information image regarding a game progress on the first display unit in the game execution mode, and a second information image regarding the game progress on the second display unit in the game execution mode;
   a panel image display unit for displaying a panel image including an operation panel image corresponding to an operation associated with the game progress, or a display panel image corresponding to a display associated with the game progress on a panel image display area of the second display unit in the game execution mode;
   a game control unit for drawing the game image according to the operation, and for providing the game image to the game image display unit when the operation on the operation panel image is detected on the touch panel in the game execution mode;
   a panel image registration unit for displaying the panel image display area and a candidate image which is a candidate of the panel image displayed on the panel image display area, and for arranging and displaying the candidate image when a selection operation is performed on the panel image display area as the panel image when the selection operation of the candidate image is detected on the touch panel on the second display unit in the customization mode,
   the game image display unit being arranged to render the first information image not displayed, when the first information image and the second information image are equal.

2. The game system according to claim 1,
wherein the panel image registration unit detects a movement operation to move the candidate image to the panel image display area as the selection operation, and arranges the candidate image at a position where the movement operation is performed as the panel image.

3. The game system according to claim 1,
wherein the panel image display area is divided into a plurality of sections;
wherein the candidate image has a shape which occupies one or more sections;
wherein the panel image registration unit applies the candidate image after being moved to one of the plurality of sections which has the same shape as the candidate image, and arranges the candidate image in the panel image display area as the panel image.

4. The game system according to claim 1,
wherein the panel image registration unit deforms a shape of an operator image or changes a position within the operation panel image of the operator image in response to the operation input when an operation panel image including the operator image is arranged in the panel image display area.

5. The game system according to claim 1,
wherein the panel image registration unit displays an indicator image displayed on the first display unit as the candidate image and deletes the indicator image displayed on the first display unit from the first display unit when the indicator image is arranged in the panel image display area as the panel image.

6. The game system according to claim 1,
wherein the panel image registration unit displays a second candidate image which corresponds to the same operation as the one of the first candidate image or the same display as the one of the first candidate image and has a different size from the one of the first candidate image.

7. A game control method executed by a computer controlling a first display unit, a second display unit, and a touch panel mounted on the surface of the second display unit, the game control method comprising:
a customization starting step for starting a customization mode to customize display contents of the second display unit in operating or stopping a game execution mode to execute the game;
a game image display step for displaying a game image in response to operation input on the first display unit and a first information image regarding a game progress on the first display unit in the game execution mode, and for displaying a second information image regarding the game progress on the second display unit in the game execution mode;
a panel image display step for displaying an operation image corresponding to an operation associated with game proceeding, a panel image including a display image corresponding to a display associated with the game proceeding on a panel image display area of the second display unit in the game execution mode;
a game control step for drawing the game image when processing corresponding to the operation is executed and providing the game image to the game image display step in the game customization mode when the operation to the operation panel image is detected on the touch panel; and
a panel image registration step for displaying the panel image display area and candidate image which is a candidate of the panel image displayed on the panel image display area, for arranging and displaying the candidate image when a selection operation is performed on the panel image display area as the panel image when the selection operation of the candidate image is detected on the touch panel on the second display unit in the customization mode,
the game image display step for rendering the first information image not displayed, when the first information image and the second information image are equal.

8. The game control method according to claim 7,
wherein the panel image registration step detects a movement operation of moving the candidate image to the panel image display area as the selection operation and arranges the candidate image at a position where the movement operation is performed as the panel image.

9. The game control method according to claim 7,
wherein the panel image display area is divided into a plurality of sections;
wherein the candidate image has a shape which occupies one or more sections;
wherein the panel image registration step includes a step for assigning the candidate image after being moved to one of the plurality of sections which has the same shape as the candidate image and arranges the candidate image in the panel image display area as the panel image.

10. The game control method according to claim 7,
wherein the panel image registration step includes a step for deforming an operation unit image or for changing a position in the operation panel image of the operation image in response to the operation input when the operation unit panel image including the operation image is arranged in the panel display area.

11. The game control method according to claim 7,
wherein the panel image registration step includes a step for displaying an indicator image displayed on the first display unit as the candidate image and for detecting the indicator image displayed on the first display unit from the first display unit when the indicator image is arranged in the panel image display area as the panel image.

12. The game control method according to claim 7,
wherein the panel image registration step includes a step for displaying the candidate image which corresponds to the same operation as the one of the first candidate image or the same display as the one of the first candidate image, and has a different size from the one of the first candidate image.

13. A non-transitory computer-readable storage medium storing a game program causing a computer controlling a first display unit, a second display unit, and a touch panel mounted on the surface of the second display unit to function as:
a customization mode starting means for starting a customization mode to customize display contents of the second display unit in operating or stopping a game execution mode to execute the game; further
in the game execution mode,
a game image display means for displaying a game image which proceeds in response to an operation input, a first game image display means information image regarding game progress on the first display unit, and a second information image regarding the game progress on the second display unit;
a panel image display means for displaying an operation panel image corresponding to an operation associated with progress of the game, a panel image including display panel image corresponding to a display associated with the process of the game;

a game control means for drawing a game image when processing corresponding to the operation is performed and providing the game image to the game image display means when an operation to the operation panel image is detected on the touch panel; further in the customization mode, a panel image registration means for displaying the panel image display area and a candidate image which is a candidate of the panel image displayed on the panel image display area, and for arranging and displaying the candidate image when a selection operation is performed in the panel image display area as the panel image when the selection operation of the candidate image is detected on the touch panel on the second display unit, the game image display means for rendering the first information image not displayed, when the first information image and the second information image are equal.

14. The non-transitory computer-readable storage medium storing the game program according to claim 13, wherein the panel image registration means detects a movement operation to move the candidate image to the panel image display area as the selection operation and arranges the candidate image at a position where the movement operation is performed as the panel image.

15. The non-transitory computer-readable storage medium storing the game program according to claim 13, wherein the panel image display area is divided into a plurality of sections;

wherein the panel image registration means applies the candidate image after being moved to the section which has the same shape as the candidate image and arranges the candidate image in the panel image display area as the panel image.

16. The non-transitory computer-readable storage medium storing the game program according to claim 13, wherein the panel image registration means is for deforming an operator image or changes a position within the operation panel image of the operator image in response to the operation input when the operation unit panel image including the operator image therein is arranged in the panel image display area.

17. The non-transitory computer-readable storage medium storing the game program according to claim 13, wherein the panel image registration means for displaying an indicator image displayed on the first display unit as a candidate image and for deleting the indicator image displayed on the first display unit from the first display unit when the indicator image is arranged in the panel image display area as the panel image.

18. The non-transitory computer-readable storage medium storing the game program, according to claim 13, wherein the panel image registration means is for displaying a second candidate image which corresponds to the same operation as the one of the first candidate image or the same display as the one of the first candidate image, and has a different size from the one of the first candidate image.

* * * * *